United States Patent
Arata

(10) Patent No.: US 9,417,978 B2
(45) Date of Patent: Aug. 16, 2016

(54) MANAGEMENT SYSTEM FOR MANAGING COMPUTER SYSTEM, METHOD FOR MANAGING COMPUTER SYSTEM, AND STORAGE MEDIUM

(75) Inventor: Shigeki Arata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 14/358,006

(22) PCT Filed: Nov. 14, 2011

(86) PCT No.: PCT/JP2011/076187
§ 371 (c)(1),
(2), (4) Date: May 13, 2014

(87) PCT Pub. No.: WO2013/072985
PCT Pub. Date: May 23, 2013

(65) Prior Publication Data
US 2014/0317441 A1    Oct. 23, 2014

(51) Int. Cl.
*G06F 11/00* (2006.01)
*G06F 11/20* (2006.01)

(52) U.S. Cl.
CPC ............ *G06F 11/2033* (2013.01); *G06F 11/20* (2013.01)

(58) Field of Classification Search
CPC .................................................. G06F 11/2033
See application file for complete search history.

(56) References Cited

U.S. PATENT DOCUMENTS

| | | | | |
|---|---|---|---|---|
| 2004/0107300 A1* | 6/2004 | Padmanabhan | ....... | G06F 3/0617 710/1 |
| 2005/0193227 A1 | 9/2005 | Nakahara et al. | | |
| 2005/0228947 A1* | 10/2005 | Morita | ................ | G06F 11/2046 711/114 |
| 2006/0209677 A1* | 9/2006 | McGee | .................. | H04L 12/44 370/216 |
| 2007/0180314 A1* | 8/2007 | Kawashima | ........ | G06F 11/2023 714/15 |
| 2008/0056123 A1* | 3/2008 | Howard | ............. | H04L 41/0663 370/225 |
| 2009/0259737 A1* | 10/2009 | Aikoh | .................. | G06F 9/5088 709/221 |
| 2010/0138686 A1 | 6/2010 | Arata et al. | | |
| 2011/0231843 A1 | 9/2011 | Shimogawa | | |

FOREIGN PATENT DOCUMENTS

| | | |
|---|---|---|
| JP | 2005234917 A | 9/2005 |
| JP | 2007207219 A | 8/2007 |
| JP | 2009-252204 | 10/2009 |
| JP | 2010128644 A | 6/2010 |
| JP | 2011-197852 | 10/2011 |

* cited by examiner

*Primary Examiner* — Christopher McCarthy
(74) *Attorney, Agent, or Firm* — Volpe and Koenig, P.C.

(57) ABSTRACT

An exemplary management system stores computer performance management information, I/O performance management information regarding communication by I/O adapters, and priority management information associating a priority of a failover destination pair candidate including failover destination computer and destination I/O adapter candidates with a relationship between a failover source computer and destination computer candidate and with an I/O performance relationship between failover source and destination I/O adapter candidates. The management system determines failover destination pair candidates, each including failover destination computer and I/O adapter candidates. The management system determines a priority of each failover destination pair candidates with reference to the computer and I/O performance management information, and the priority management information based on a performance relationship between the active computer and the failover destination computer candidate and on a performance relationship between the active I/O adapter and the failover destination I/O adapter candidate.

10 Claims, 20 Drawing Sheets

| | | SERVER COMPUTER PERFORMANCE MANAGEMENT TABLE | | | | | |
|---|---|---|---|---|---|---|---|
| 711 | 712 | 713 | | 714 | 715 | 716 | 717 |
| SERVER IDENTIFIER | SLOT NUMBER | CPU PERFORMANCE | | MEMORY PERFORMANCE | SMP CONFIGURATION | EXECUTION FORM | STATE |
| SERVER COMPUTER A | 0 | 2GHz × 8 CORES | | 256GByte | 2slotSMP | ACTIVE | NORMAL |
| SERVER COMPUTER B | 1 | 2.5GHz × 8 CORES | | 256GByte | NONE | ACTIVE | NORMAL |
| SERVER COMPUTER C | 7 | 2GHz × 4 CORES | | 128GByte | NONE | STANDBY | NORMAL |
| SERVER COMPUTER D | 2 | 2GHz × 4 CORES | | 128GByte | NONE | ACTIVE | NORMAL |
| SERVER COMPUTER E | 3 | 2.5GHz × 8 CORES | | 256GByte | NONE | STANDBY | NORMAL |

HBA PERFORMANCE MANAGEMENT TABLE (702)

| HBA IDENTIFIER (721) | SLOT NUMBER (722) | PERFORMANCE (723) | VENDOR (724) | EXECUTION FORM (725) | STATE (726) |
|---|---|---|---|---|---|
| HBA-A | 0 | 2Gbps | COMPANY A | ACTIVE | NORMAL |
| HBA-B | 1 | 4Gbps | COMPANY A | ACTIVE | NORMAL |
| HBA-C | 0 | 2Gbps | COMPANY A | ACTIVE | NORMAL |
| HBA-D | 2 | 4Gbps | COMPANY A | STANDBY | NORMAL |

Fig. 7C

FC SWITCH PERFORMANCE MANAGEMENT TABLE (703)

| FC SWITCH IDENTIFIER (731) | PERFORMANCE (732) |
|---|---|
| FC SW-A | 4Gbps |

Fig. 8A

SERVER COMPUTER-HBA CONNECTION MANAGEMENT TABLE (801)

| SERVER IDENTIFIER (811) | SERVER STORAGE CASE IDENTIFIER (812) | HBA IDENTIFIER (813) | HBA STORAGE CASE IDENTIFIER (814) | FC SWITCH IDENTIFIER (815) |
|---|---|---|---|---|
| SERVER COMPUTER A | CASE A | HBA-A | CASE A | FC SW-A |
| SERVER COMPUTER B | CASE A | HBA-B | CASE A | FC SW-A |
| SERVER COMPUTER C | CASE A | NONE | NONE | NONE |
| SERVER COMPUTER D | CASE B | HBA-C | CASE B | FC SW-A |
| SERVER COMPUTER E | CASE B | NONE | NONE | NONE |
| NONE | NONE | HBA-D | CASE B | FC SW-A |

Fig. 8B

INTER-PCIe SWITCH CONNECTION MANAGEMENT TABLE (802)

| ORDER (821) | CASE IDENTIFIER (822) |
|---|---|
| 1 | CASE A |
| 2 | CASE B |

Fig. 9A

SERVER COMPUTER PERFORMANCE PRIORITY MANAGEMENT TABLE (901)

| SERVER COMPUTER PERFORMANCE (911) | PRIORITY (912) |
|---|---|
| ACTIVE＝STANDBY | 1 |
| ACTIVE＜STANDBY | 2 |
| ACTIVE＞STANDBY | 3 |

Fig. 9B

I/O PERFORMANCE PRIORITY MANAGEMENT TABLE (902)

| I/O PERFORMANCE (921) | PRIORITY (922) |
|---|---|
| ACTIVE＝STANDBY | 1 |
| ACTIVE＜STANDBY | 2 |
| ACTIVE＞STANDBY | 3 |

Fig. 9C

TOPOLOGY PRIORITY MANAGEMENT TABLE (903)

| TOPOLOGY (931) | PRIORITY (932) |
|---|---|
| SAME CASE | 1 |
| SEPARATE CASES (NEIGHBORING) | 2 |
| SEPARATE CASES (NEIGHBORING WITH ONE CASE THEREBETWEEN) | 3 |
| SEPARATE CASES (NEIGHBORING WITH TWO CASES THEREBETWEEN) | 4 |

Fig. 9D

904 — FAILOVER METHOD PRIORITY MANAGEMENT TABLE

| FAILOVER METHOD (941) | PRIORITY (942) |
|---|---|
| CONTINUED USE OF HBA | 1 |
| FAILOVER OF HBA | 2 |
| FAILOVER OF BOTH | 3 |

Fig. 9E

905 — SERVER POSITIONAL RELATIONSHIP PRIORITY MANAGEMENT TABLE

| SERVER POSITIONAL RELATIONSHIP (951) | PRIORITY (952) |
|---|---|
| SAME SERVER COMPUTER | 1 |
| SEPARATE SERVER COMPUTERS IN SAME CASE | 2 |
| SEPARATE SERVER COMPUTERS IN SEPARATE CASES | 3 |

Fig. 9F

906 — TABLE PRIORITY MANAGEMENT TABLE

| TABLE (961) | PRIORITY (962) |
|---|---|
| SERVER COMPUTER PERFORMANCE PRIORITY MANAGEMENT TABLE | 1 |
| I/O PERFORMANCE PRIORITY MANAGEMENT TABLE | 2 |
| TOPOLOGY PRIORITY MANAGEMENT TABLE | 3 |
| FAILOVER METHOD PRIORITY MANAGEMENT TABLE | 4 |
| SERVER POSITIONAL RELATIONSHIP PRIORITY MANAGEMENT TABLE | 5 |

Fig. 10

FAILOVER DESTINATION CANDIDATE TABLE 500

| | POSSIBLE FAILOVER DESTINATION PAIR 501 | SERVER COMPUTER PERFORMANCE 502 | I/O PERFORMANCE 503 | TOPOLOGY 504 | FAILOVER METHOD 505 | SERVER POSITIONAL RELATIONSHIP 506 |
|---|---|---|---|---|---|---|
| 1 | SERVER COMPUTER C — HBA-B | ACTIVE > STANDBY | ACTIVE = STANDBY | SAME CASE | CONTINUED USE OF HBA | SEPARATE SERVER COMPUTERS IN SAME CASE |
| 2 | SERVER COMPUTER C — HBA-D | ACTIVE > STANDBY | ACTIVE = STANDBY | SEPARATE CASES (NEIGHBORING) | FAILOVER OF BOTH | SEPARATE SERVER COMPUTERS IN SAME CASE |
| 3 | SERVER COMPUTER E — HBA-B | ACTIVE = STANDBY | ACTIVE = STANDBY | SEPARATE CASES (NEIGHBORING) | CONTINUED USE OF HBA | SEPARATE SERVER COMPUTERS IN SEPARATE CASES |
| 4 | SERVER COMPUTER E — HBA-D | ACTIVE = STANDBY | ACTIVE = STANDBY | SAME CASE | FAILOVER OF BOTH | SEPARATE SERVER COMPUTERS IN SEPARATE CASES |

Fig. 11

| USER REQUIREMENT MANAGEMENT TABLE ~600 | |
|---|---|
| CONFIGURED FACTOR ~601 | CONTENT ~602 |
| PRIORITY FOR DETERMINING FAILOVER DESTINATION | SERVER COMPUTER PERFORMANCE > I/O PERFORMANCE > TOPOLOGY |
| FAILOVER TO SMP CONFIGURATION | MAINTAIN SMP CONFIGURATION |

Fig. 17

| | POSSIBLE FAILOVER DESTINATION PAIR | FAILOVER DESTINATION CANDIDATE ||||||| |
| --- | --- | --- | --- | --- | --- | --- | --- | --- |
| | | SERVER COMPUTER PERFORMANCE | I/O PERFORMANCE | TOPOLOGY | FAILOVER METHOD | SERVER POSITIONAL RELATIONSHIP | PRIORITY | SELECT |
| 1 | SERVER COMPUTER C —HBA-B | ACTIVE>STANDBY | ACTIVE=STANDBY | SAME CASE | CONTINUED USE OF HBA | SEPARATE SERVER COMPUTERS IN SAME CASE | 3 | ☐ |
| 2 | SERVER COMPUTER C —HBA-D | ACTIVE>STANDBY | ACTIVE=STANDBY | SEPARATE CASES (NEIGHBORING) | FAILOVER OF BOTH | SEPARATE SERVER COMPUTERS IN SAME CASE | 4 | ☐ |
| 3 | SERVER COMPUTER E —HBA-B | ACTIVE= STANDBY | ACTIVE=STANDBY | SEPARATE CASES (NEIGHBORING) | CONTINUED USE OF HBA | SEPARATE SERVER COMPUTERS IN SEPARATE CASES | 2 | ☐ |
| 4 | SERVER COMPUTER E —HBA-D | ACTIVE=STANDBY | ACTIVE=STANDBY | SAME CASE | FAILOVER OF BOTH | SEPARATE SERVER COMPUTERS IN SEPARATE CASES | 1 | ☑ |

EXECUTE FAILOVER

MANAGEMENT SYSTEM FOR MANAGING COMPUTER SYSTEM, METHOD FOR MANAGING COMPUTER SYSTEM, AND STORAGE MEDIUM

BACKGROUND

The present invention relates to a management system for managing a computer system, a method for managing a computer system, and a storage medium. In particular, the present invention relates to failover of an apparatus in a computer system.

One example of conventional computer systems includes server computers and a storage system that offers volume to the server computers. A server computer accesses the storage system via an Input/Output (I/O) adapter that is provided in the same case and connected directly to the server computer via wiring inside the case.

If an active server computer or an active I/O adapter fails, the computer system performs failover from a failed pair of the active server computer and the active I/O adapter to a pair of a standby server computer and a standby I/O adapter. The computer system performs failover from a path between the storage system and the active I/O adapter to a path between the storage system and the standby I/O adapter.

In another example of conventional computer systems, if an active server computer fails in a configuration in which server computers and I/O adapters are connected via a network, failure recovery is carried out by switching a path to an active I/O adapter to another standby server computer, that is, performing failover only from the active server computer to the standby server computer, thereby taking over the active I/O adapter.

According to a management computer disclosed in Patent Literature 1, if an active server computer fails, a path to a storage system is switched from the active server computer to a standby server computer so that the standby server computer takes over operations. The management computer refers to a failover strategy table in which apparatus information of server computers are placed in correspondence with failover methods, and selects failover strategy in accordance with such apparatuses as active server computers and standby server computers.

Patent Literature 1: JP2010-128644 A

SUMMARY

According to failover from an active server computer to a standby server computer of the aforementioned conventional techniques, an I/O adapter that connects to a standby server computer is determined in advance. Therefore, the aforementioned conventional techniques do not judge which I/O adapter is to be used for a failover destination. However, in a system configuration in which performance or reliability varies depending on how a server computer and an I/O adapter are selected as failover destinations, failover methods of the conventional techniques have a high risk of lowering processing performance or reliability of a server computer and an I/O adapter after failure recovery.

An aspect of the present invention is A management system that manages a computer system and includes a processor and a storage apparatus, the computer system including a plurality of computers and a plurality of I/O adapters via which the plurality of computers connect to a network. The storage apparatus stores computer performance management information for managing performance of each of the plurality of computers, I/O performance management information for managing I/O performance of communication by each of the plurality of I/O adapters, and priority management information for associating a priority of a failover destination pair candidate including a failover destination computer candidate and a failover destination I/O adapter candidate with a computer performance relationship between a failover source computer and the failover destination computer candidate and with an I/O performance relationship between a failover source I/O adapter and the failover destination I/O adapter candidate. The processor determines one or more failover destination pair candidates each including a failover destination computer candidate and a failover destination I/O adapter candidate in order to perform failover from one apparatus out of a pair of an active computer and an active I/O adapter to another apparatus. The processor determines a priority of each of the one or more failover destination pair candidates with reference to the computer performance management information, the I/O performance management information, and the priority management information based on a performance relationship between the active computer and the failover destination computer candidate and on a performance relationship between the active I/O adapter and the failover destination I/O adapter candidate.

One aspect of the present invention can alleviate the risk of lowering performance or reliability after failover of a pair of a computer and an I/O adapter.

BRIEF DESCRIPTION OF THE DRAWINGS

FIG. 7A shows an example of a server computer performance management table according to the present embodiment.

FIG. 7B shows an example of an HBA performance management table according to the present embodiment.

FIG. 7C shows an example of an FC switch performance management table according to the present embodiment.

FIG. 8A shows an example of a server-HBA connection management table according to the present embodiment.

FIG. 8B shows an example of an inter-PCIe switch connection management table according to the present embodiment.

FIG. 9A shows an example of a server computer performance priority management table according to the present embodiment.

FIG. 9B shows an example of an I/O performance priority management table according to the present embodiment.

FIG. 9C shows an example of a topology priority management table according to the present embodiment.

FIG. 9D shows an example of a failover method priority management table according to the present embodiment.

FIG. 9E shows an example of a server positional relationship priority management table according to the present embodiment.

FIG. 9F shows an example of a table priority management table according to the present embodiment.

FIG. 10 shows an example of a failover destination candidate table according to the present embodiment.

FIG. 11 shows an example of a user requirement management table according to the present embodiment.

FIG. 17 shows an example of a failover destination candidate image that is presented by the management server computer to the administrator in the present embodiment.

DESCRIPTION OF THE EMBODIMENTS

The following describes an embodiment of the present invention with reference to the drawings. For clarity of explanation, the following description and drawings are abridged and simplified where appropriate. A computer system according to the present embodiment includes a management system, a plurality of computers, and a plurality of Input/Output (I/O) adapters. A computer connects to a network via an I/O adapter assigned thereto, and accesses a storage system via, for example, a data communication network.

The management system according to the present embodiment retains priority management tables for determining a failover destination pair. If a computer or an I/O adapter fails, the management system selects failover destination pair candidates, which are pairs of a failover destination computer candidate and a failover destination I/O adapter candidate, and determines priorities thereof. In this manner, the administrator or system can select an appropriate failover destination pair.

Figure 1:
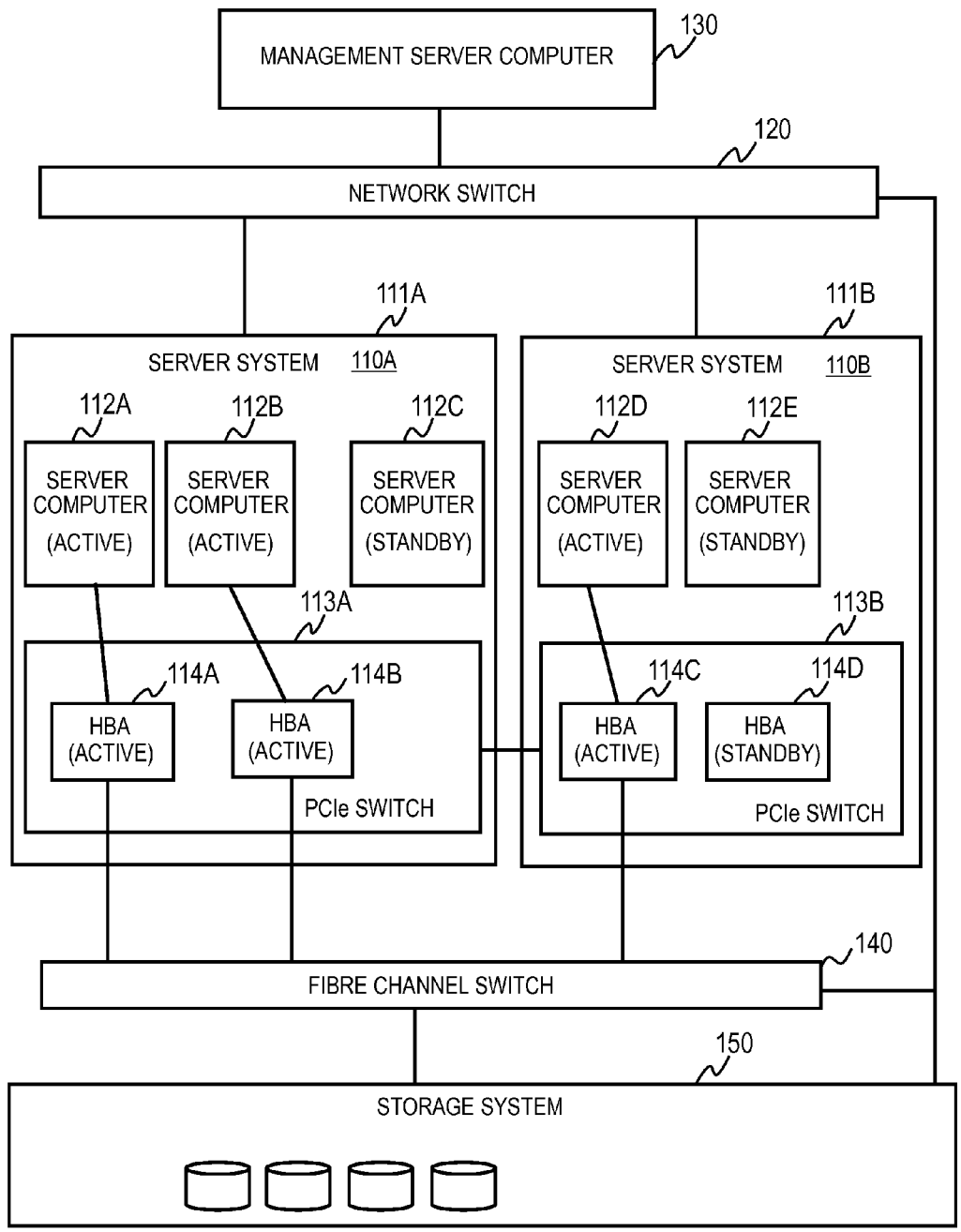
FIG. 1 schematically shows an exemplary configuration of a computer system according to a present embodiment.

FIG. 1 is a block diagram schematically showing an exemplary configuration of the computer system according to the present embodiment. The computer system includes a plurality of (in the present example, two) server systems 110A, 110B, a network switch 120, a management server computer 130, a fibre channel switch (FC switch) 140, and a storage system 150. In the computer system according to the present embodiment, the number of apparatuses varies depending on design.

The server system 110A includes server computers (operation server computers) 112A to 112C and a PCIe switch 113A that are present in a case 111A. The PCIe switch 113A includes Host Bus Adapters (HBAs) 114A, 114B. The server system 110B includes server computers 112D, 112E and a PCIe switch 113B that are present in a case 111B. The PCIe switch 113B includes HBAs 114C, 114D. HBAs are I/O adapters of server computers, and serve as interfaces that execute, for example, protocol conversion for connecting the computers to a network.

The PCIe switches 113A, 113B are communicably connected by wiring between the cases 111A and 111B. Each of the server systems 110A, 110B includes a controller (not shown in the drawings) that controls the entirety of the server system.

A network including the network switch 120 is a management network. The management server computer 130 connects to other apparatuses, i.e., the server systems 110A, 110B, the fibre channel switch 140, and the storage system 150 via the network switch 120. The management server computer 130 transmits and receives data necessary for managing each apparatus via the network switch 120. Typically, the management network is an IP network. Alternatively, other protocols may be used.

A network including the fibre channel switch 140 is a network for communication of data stored in the storage system 150. It is a Storage Area Network (SAN) in the present configuration. In the present example, SAN makes use of fibre channel. SAN can include a plurality of fibre channel switches.

This network for communication of data may make use of protocols different from fibre channel, as long as it is a network for data communication. It may be a network other than SAN, such as an Internet Small Computer System Interface (iSCSI) network and an IP network.

The storage system 150 offers volume to each of the server systems 110A, 110B. Each of the server computers in the server systems 110A, 110B accesses the volume of the storage system 150 via the FC switch 140. The PCIe switches 113A, 113B are connected via inter-case wiring. An HBA in one of the PCIe switches 113A, 113B is assigned to each of the server computers in the server systems 110A, 110B.

Each of the server computers in the server systems 110A, 110B connects to an HBA assigned thereto, and connects to the fibre channel switch 140 via the assigned HBA. In FIG. 1, the server computers 112A, 112B, 112D are active server computers, and access the volume of the storage system 150 via the HBAs 114A, 114B, 114C, respectively. The server computers 112C, 112E are standby server computers and are not connected to any of the HBAs. The HBA 114D is a standby HBA and is not assigned to any of the server computers.

One active HBA is assigned to one active server computer. Unless there is failover caused by the occurrence of failure or by an instruction from the administrator, an active server computer keeps using the same active HBA assigned thereto for data communication with the storage system 150.

Figure 2:
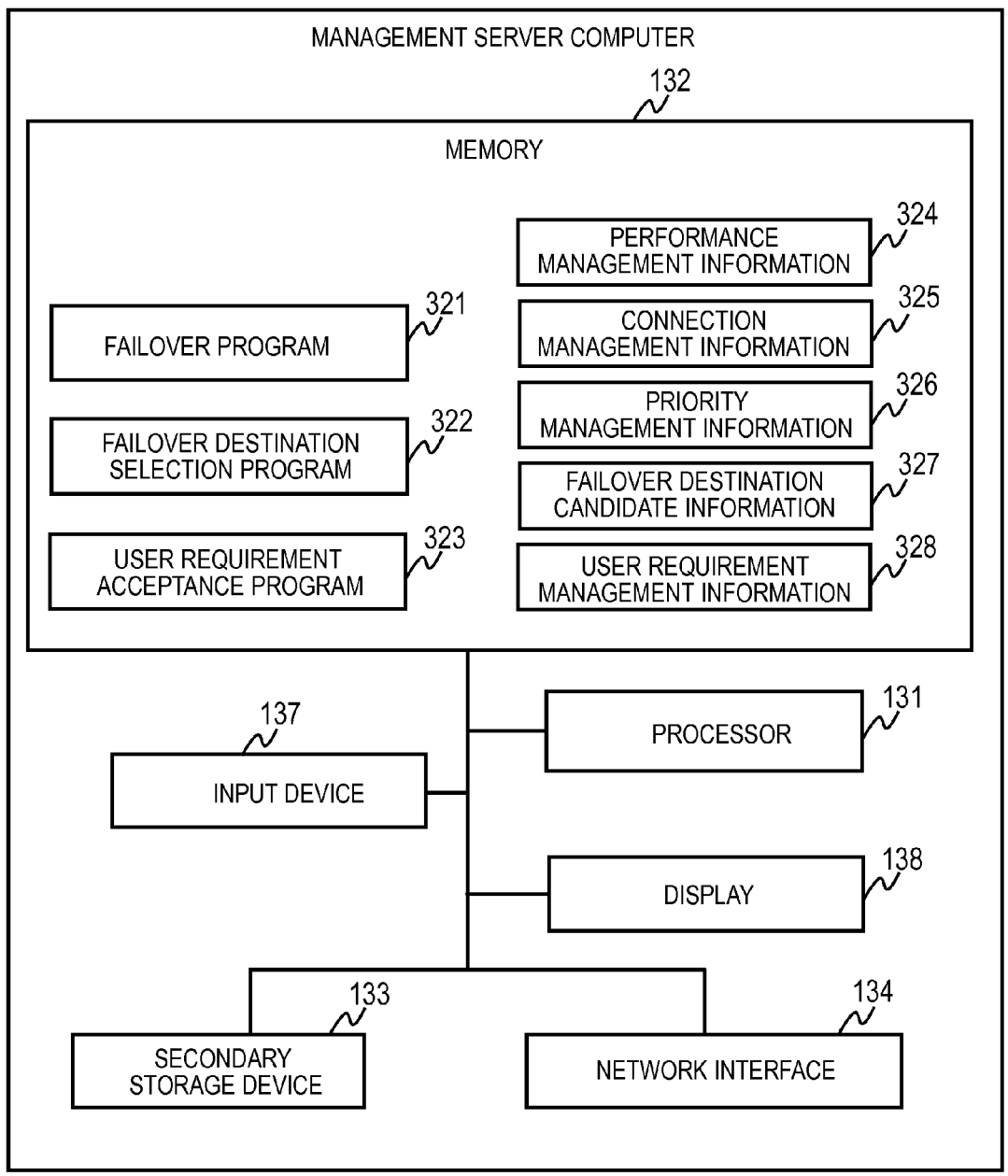
FIG. 2 schematically shows an exemplary configuration of a management server computer according to the present embodiment.

FIG. 2 is a block diagram schematically showing a hardware configuration and a software configuration of the management server computer 130. A management server computer 130 includes a processor 131, a memory 132 which is a primary storage device, a secondary storage device 133, a network interface 134, an input device 137, and a display 138. They are connected via a bus.

The management server computer 130 is connected to the network switch 120 via the network interface 134, and communicates with other apparatuses in the system. The administrator (user) inputs and confirms necessary information using the input device 137 and the display 138. Typically, the input device 137 comprises a mouse and a keyboard.

The management server computer 130 may include an output device different from the display 138. While FIG. 2 exemplarily shows the management server computer 130 including the input/output device 137, the administrator may make use of the functions of the management server computer 130 from another terminal via a network. While the management system according to the present example comprises the management server computer 130, the management system may comprise a plurality of computers. One of the plurality of computers may be a computer for display. In order to improve the speed and reliability of management processing, the plurality of computers may realize processing equivalent to that of the management computer.

The processor 131 realizes predetermined functions of the management server computer 130 by executing programs stored in the memory 132. More specifically, the management server computer 130 stores a failover program 321, a failover destination selection program 322, and a user requirement acceptance program 323, in addition to an Operating System (OS) which is not shown in the drawings. While the management functions of the management server computer 130 are represented by the three programs in the present example, there may be any number of programs. Specifics of these programs will be described later.

The memory 132 further stores information used by these programs 321 to 323. More specifically, the memory 132 stores performance management information 324, connection management information 325, priority management information 326, failover destination candidate information 327, and user requirement management information 328. Specifics of each piece of information will be described later.

As will be described later, in the present exemplary configuration, information used for system management is stored in tables. The number of tables including necessary information, as well as information stored in each of the tables, depends on system design. In the present embodiment, information stored in a data storage area does not depend on data structure, and may be expressed using any data structure. For example, information may be expressed in a form of a table, list, or database. In this respect, the same goes for other apparatuses.

The processor 131 operates as a functional part that realizes these functions by operating in accordance with the aforementioned programs. Therefore, processing executed by the programs is processing of the processor 131 and the management server computer 130 including this processor 131. While FIG. 2 shows programs and information in the memory 132 for the sake of convenience, data necessary for processing of the management server computer 130 (including programs) is typically loaded from the secondary storage device 133 into the memory 132. The secondary storage device 133 may be connected to the memory 132 via a network. In these respects, the same goes for other computers.

Figure 3:
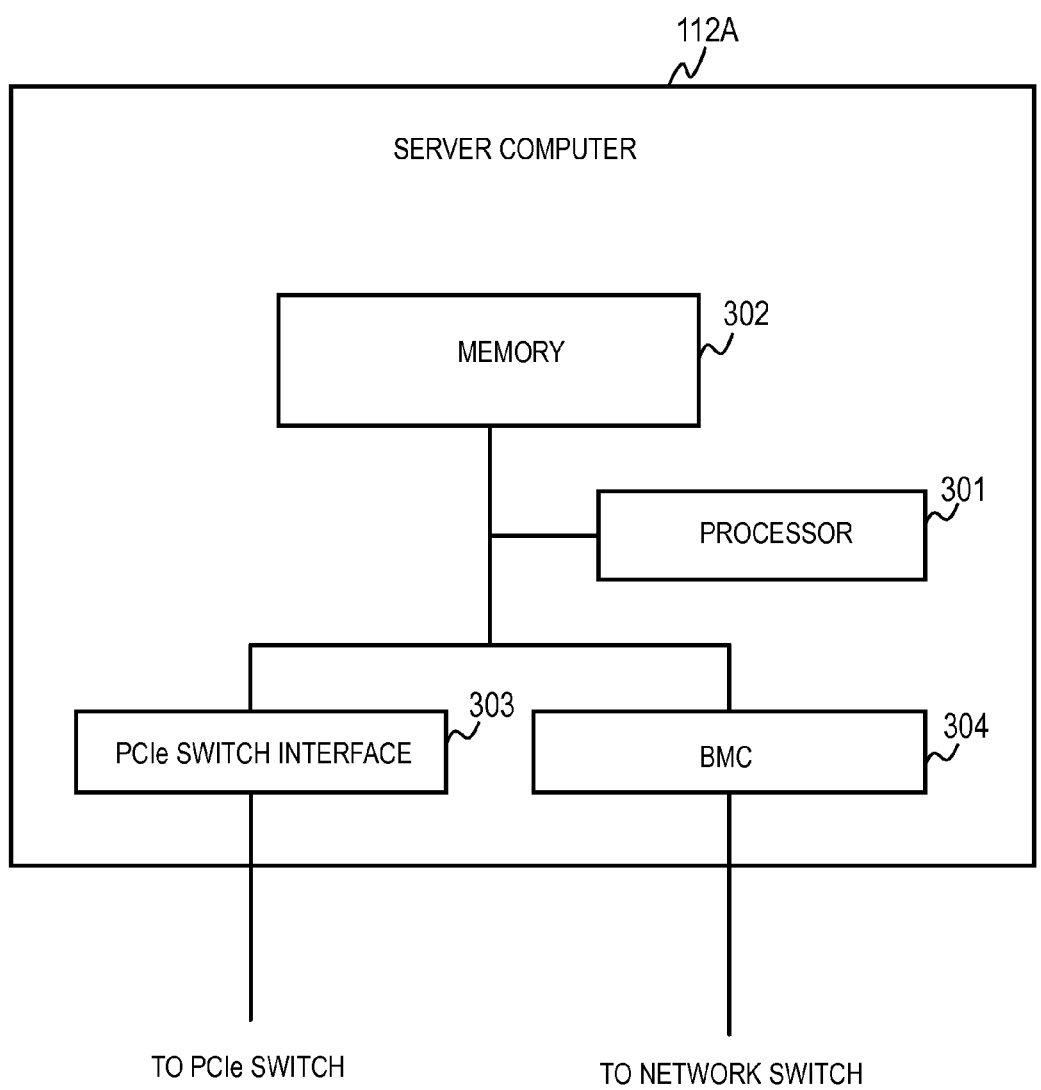
FIG. 3 schematically shows an exemplary configuration of a server computer according to the present embodiment.

FIG. 3 is a block diagram schematically showing a hardware configuration of the server computers 112A to 112E. The server computers 112A to 112E have similar fundamental hardware configurations. Each of the server computers 112A to 112E includes a processor 301, a memory 302 which is a primary storage device, a PCIe switch interface 303, and a Baseboard Management Controller (BMC) 304.

Although not shown in the drawings, the memory 302 stores an OS, application programs, and information that the programs refer to, and the processor 301 operates in accordance with these programs. Each of the server computers connects to the PCIe switch 113A or 113B via the PCIe switch interface 303. In the present computer system, the aforementioned data stored in the memory 302 is loaded from the storage system 150.

The BMC 304 functions as an interface via which the server computer connects to the network switch 120. The BMC 304 is also a controller for managing the server computer 112A. It monitors hardware error in the server computer 112A and notifies the OS of the server computer 112A and a case controller of the server system (not shown in the drawings) of the hardware error.

Figure 4:
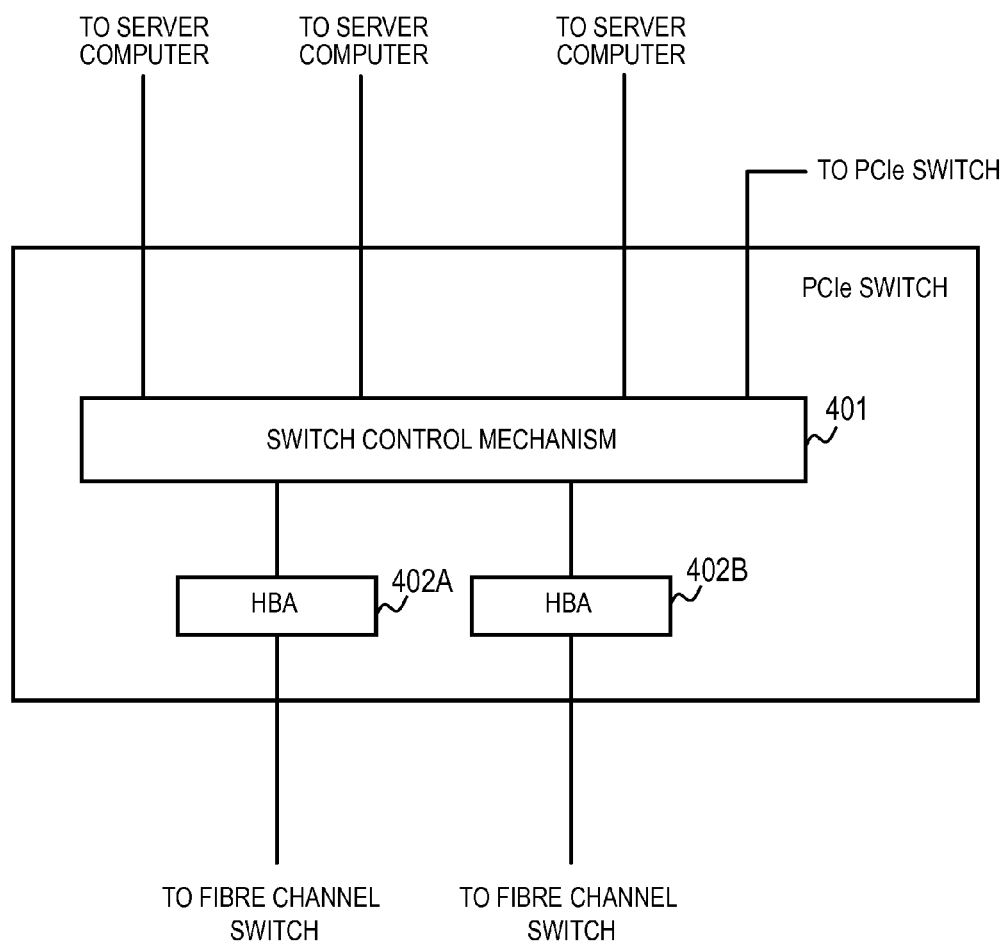
FIG. 4 schematically shows an exemplary configuration of a PCIe switch according to the present embodiment.

FIG. 4 is a block diagram schematically showing a configuration of the PCIe switches 113A, 113B. Each of the PCIe switches 113A, 113B includes a switch control mechanism 401 and a plurality of HBAs. In the example of FIG. 4, two HBAs 402A, 402B are incorporated. In the present example, the HBAs 402A, 402B are communication interface cards for connecting to an FC network.

The switch control mechanism 401 controls connection between (a pair of) a server computer and an HBA. The switch control mechanism 401 connects a server computer and an HBA assigned to that server computer. In communication between a server computer and the storage system 150, the switch control mechanism 401 transfers data to that server computer and the storage system 150 via an HBA assigned to that server computer.

The switch control mechanism 401 can connect to the switch control mechanism 401 of another PCIe switch (a PCIe switch in a case of another server system). In the case where an HBA in another case is assigned to a server computer in the same case, the switch control mechanism 401 not only transfers data received from this server computer in the same case to the switch control mechanism 401 in a PCIe switch accommodated in the other case, but also receives data received by the HBA in the other case from the switch control mechanism 401 in the other case and transfers the same to the server computer in the same case.

The switch control mechanism 401 in the same case as an assigned HBA transfers data transferred from the switch control mechanism 401 in another case to the HBA in the same case, and transfers data received from this HBA to the switch control mechanism 401 of a PCIe switch in the other case.

In the case where the computer system includes three or more server systems and there are three or more PCIe switches accommodated in different cases, the PCIe switches are connected in series. Each PCIe switch sequentially transfers communication data between a pair of a server computer and an HBA.

Figure 5:
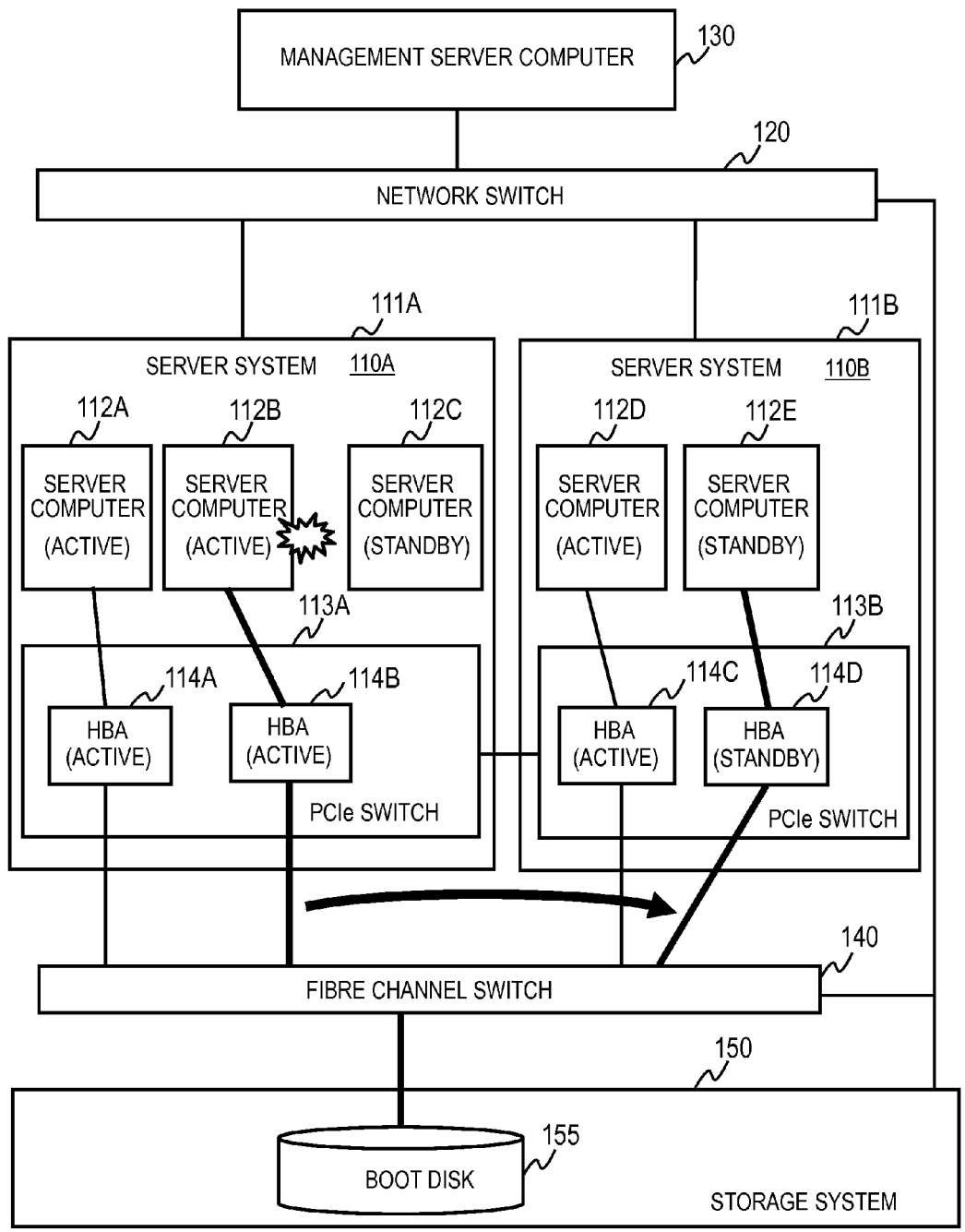
FIG. 5 shows an example of failover according to the present embodiment.

FIG. 5 shows an example of failover in the computer system according to the present embodiment. If a server computer or an HBA fails, the computer system performs failover either automatically or in accordance with, for example, an instruction from the administrator for maintenance. The present computer system performs failover from a pair of an active server computer and an active HBA to another pair based on a predetermined standard. One or both apparatuses out of a server computer and an HBA differ between a failover destination pair and a failover source pair. In the example of FIG. 5, both apparatuses fail over.

FIG. 5 shows failover attributed to failure that has occurred in the active server computer 112B. The active server computer 112B communicates with the storage system 150 via the active HBA 114B. The computer system performs failover from the active server computer 112B to the standby server computer 112E in another case 111B, and failover from the active HBA 114B to the standby HBA 114D in the case 111B.

The failover destination server computer 112E takes over tasks of the server computer 112B by reading necessary data from a boot disk 155 of the storage system 150 via the failover destination HBA 114D. Thereafter, the server computer 112E communicates with the storage system 150 using the HBA 114D.

Typically, the administrator replaces the failed server computer 112E with a new server computer, and then performs failover from the pair of the server computer 112E and the HBA 114D to the pair of the newly incorporated server computer and the HBA 114B using the management server computer 130.

The management server computer 130 selects a pair of a server computer and an HBA representing failover destinations so as to suppress a decrease in performance and reliability of the pair of the server computer and the HBA representing the failover destinations compared to performance and reliability of the active pair to the greatest extent possible. In this manner, the decrease in performance and reliability after the failover is alleviated. Specifics of a method in which the management server computer 130 determines a failover destination pair will be described later.

Figure 6:
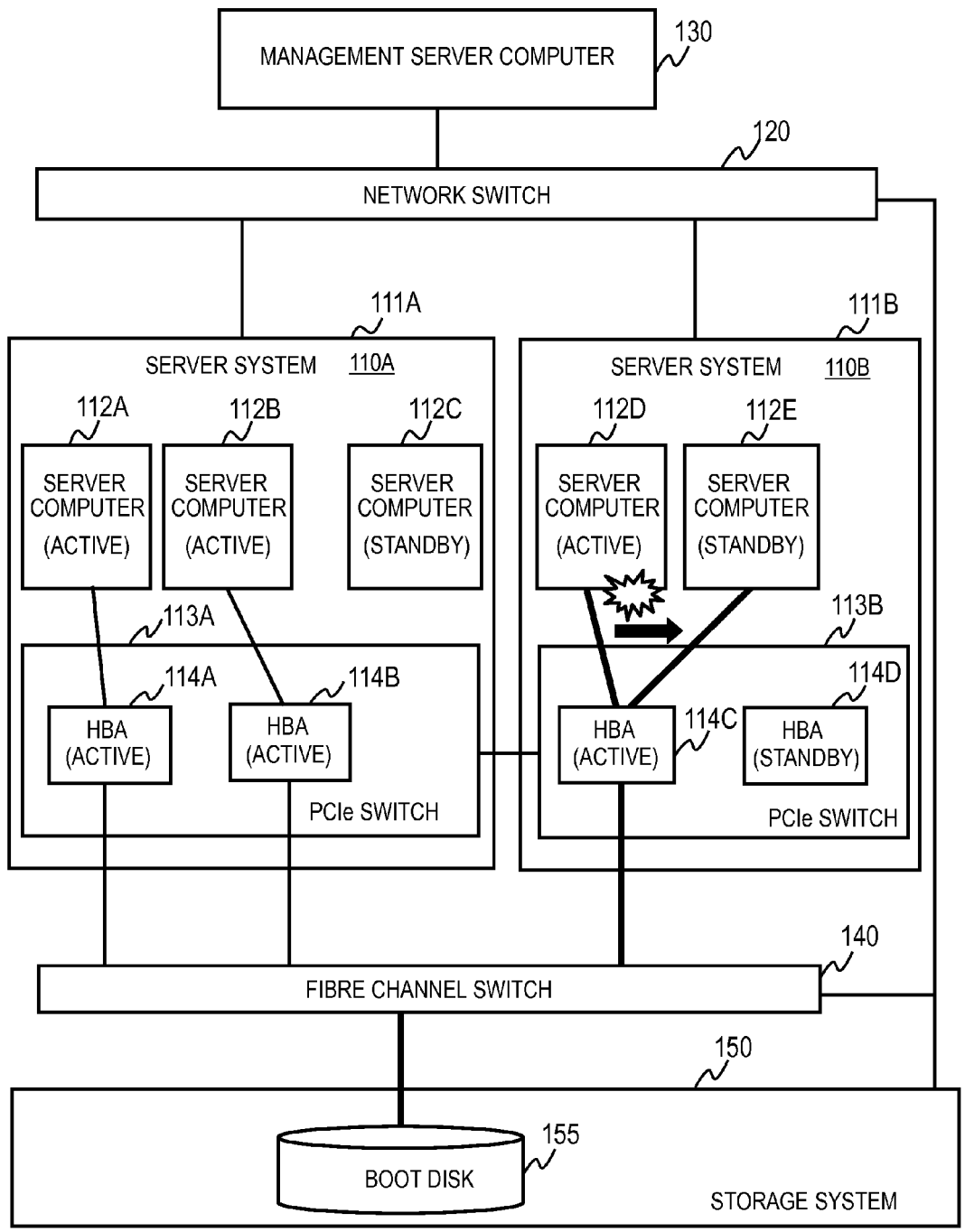
FIG. 6 shows another example of failover according to the present embodiment.

FIG. 6 shows another example of failover in the computer system according to the present embodiment. FIG. 6 shows failover attributed to failure that has occurred in the active server computer 112D. The active server computer 112D communicates with the storage system 150 via the active HBA 114C. The computer system performs failover from the active server computer 112D to the standby server computer 112E in the same case 111B, and keeps using the active HBA 114C without failover of the active HBA 114C.

The failover destination server computer 112E takes over tasks of the server computer 112D by reading necessary data from the boot disk 155 of the storage system 150 via the active HBA 114C. Thereafter, the server computer 112E communicates with the storage system 150 using the HBA 114D. Similarly to the example of FIG. 5, the management server computer 130 selects a pair of a server computer and an HBA representing failover destinations so as to suppress a decrease in performance and reliability of the pair of the server computer and the HBA representing the failover destinations compared to performance and reliability of the active pair to the greatest extent possible.

FIGS. 7A to 7C show examples of the performance management information 324 stored in the management server computer 130. The performance management information 324 manages performances of the server computers 112A to 112E, the HBAs 114A to 114D, and the FC switch 140. More specifically, the performance management information 324 includes a server computer performance management table 701 shown in FIG. 7A, an HBA performance management table 702 shown in FIG. 7B, and an FC switch performance management table 703 shown in FIG. 7C.

The server computer performance management table 701 includes a server identifier column 711, a slot number column 712, a CPU performance column 713, a memory performance column 714, a Symmetric MultiProcessing (SMP) configuration column 715, an execution form column 716, and a state column 717.

The server identifier column 711 stores server identifiers for identifying server computers. Server computers A to E correspond to the server computers 112A to 112E, respectively. The slot number column 712 stores slot numbers for identifying slots to which the server computers are attached in the cases. In the present embodiment, the expressions "identification information", "identifier", "title", "name", and "ID" are interchangeable unless specifically stated.

The CPU performance column 713 and the memory performance column 714 respectively store CPU performances and memory performances of the server computers. In the present example, the CPU performances are expressed by the operating frequency and the number of cores of a CPU. In the present example, the memory performances are expressed by memory capacity. These performances may be expressed by other indexes.

The SMP configuration column 715 stores data indicating whether the server computers have the SMP configuration, and if they have the SMP configuration, indicating the number of server computers included therein (slots). As is widely known, a server computer with the SMP configuration includes a plurality of server computers coupled together, and functions as a single server computer. For example, the server computer A (112A) comprises two server computers attached to two slots.

A slot number of a server computer with the SMP configuration is a slot number for one of the server computers included therein. The CPU performance and the memory performance of such a server computer are expressed by the CPU performances and the memory performances of all of the server computers constituting the same. For example, the server computer A comprises two server computers that each include a 2-GHz×4-core CPU and a 128-GByte memory.

The execution form column 716 stores data indicating whether the server computers are active server computers or standby server computers. In the present example, the execution forms of the server computers are not changed. The state column 717 stores data indicating the operation states of the server computers. More specifically, the state column 717 stores data indicating whether the operations of the server computers are normal/abnormal, or failover is in progress.

If a "normal" active server computer fails, the state of this active server computer is changed to "abnormal" (not shown in the drawings), and this failed server computer fails over to a "normal" standby server computer. After the failover, the state of the standby server computer is changed from "normal" to "failover in progress" (not shown in the drawings).

The management server computer 130, e.g., the failover program 321 or other table management programs, can acquire information to be stored in the server computer performance management table 701 from the server systems 110A, 110B. The controllers of the server systems 110A, 110B transmit necessary information in response to a request from the management server computer 130. In this respect, the same goes for the HBA performance management table 702, which will be described below.

The HBA performance management table 702 shown in FIG. 7B includes an HBA identifier column 721, a slot number column 722, a performance column 723, a vendor column 724, an execution form column 725, and a state column 726. The HBA identifier column 721 stores identifiers for identifying the HBAs in the computer system. HBA-A to HBA-D correspond to the HBA 114A to the HBA 114D, respectively. The slot number column 712 stores slot numbers for identifying slots to which the HBAs are attached in the cases of the server systems.

The performance column 723 stores values indicating the performances of the HBAs. These values are expressed by a link speed (Gbps). The vendor column 724 stores values for identifying vendors of the HBAs. Information stored in the execution form column 725 and the state column 726 is similar to that of the aforementioned server computer performance management table 701, and a description thereof is omitted.

The FC switch performance management table 703 shown in FIG. 7C includes an FC switch identifier column 731 and a performance column 732. As the computer system according to the present example includes only one FC switch, the fibre channel switch performance management table 703 includes only one entry.

The FC switch identifier column 731 stores an identifier of the FC switch. The performance column 732 stores data indicating the performance of the FC switch. The performance of the FC switch is expressed by a link speed (Gbps) thereof. The I/O performance (link speed) between a server computer and the storage system 150 is determined by a minimum value of link speeds of an HBA and the FC switch.

In the present example, only one FC switch is registered with the FC switch performance management table 703. In the case where the computer system includes a plurality of FC switches, the FC switch performance management table 703 stores information of the plurality of FC switches. The management server computer 130 can acquire information to be stored in the FC switch performance management table 703 from the FC switch 140.

FIGS. 8A and 8B show examples of the connection management information 325. The connection management information 325 manages the states of connection between the server computers and HBAs, and the states of connection between the PCIe switches (cases). More specifically, the connection management information 325 includes a server computer-HBA connection management table 801 shown in FIG. 8A, and an inter-PCIe switch connection management table 802 shown in FIG. 8B.

The server computer-HBA connection management table 801 shown in FIG. 8A. includes a server identifier column 811, a server storage case identifier column 812, an HBA identifier column 813, an HBA storage case identifier column 814, and an FC switch identifier column 815. Each field in the server storage case identifier column 812 stores an identifier of the case storing the server computer identified by the server identifier in the same entry. Cases A and B are the cases 111A and 111B, respectively.

The HBA storage case identifier column 814 stores an identifier of the case storing the HBA identified by the HBA identifier in the same entry. Each field in the FC switch identifier column 815 stores an identifier of the FC switch to which the HBA in the same entry is connected.

In an entry of a server computer to which no HBA is connected (assigned) (in the present example, the server computers C, E), the fields in the HBA identifier column 813, the HBA storage case identifier column 814, and the FC switch identifier column 815 indicate a value "none". In an entry of an HBA that is not connected to any server computer (in the present example, the HBA-D), the fields in the server identifier column 811 and the server storage case identifier column 812 indicate a value "none".

The server computer-HBA connection management table 801 according to the present example indicates, for example, the following: the server computers A and B stored in the case A are connected respectively to the HBA-A and HBA-B stored in the case A; the HBA-A and HBA-B are connected to the FC switch A; the server apparatus D stored in the case B is connected to the HBA-C stored in the case B; and the HBA-C is connected to the FC switch A.

The inter-PCIe switch connection management table 802 shown in FIG. 8B includes an order column 821 and a case identifier column 822. The order column 821 stores data indicating a connection order for the cases (PCIe switches). In the present example, ascending numbers are assigned to the cases (PCIe switches) in accordance with the connection order. For example, up to a maximum of four PCIe switches can be connected.

For example, in the case where a case (PCIe switch) X, a case (PCIe switch) Y, and a case (PCIe switch) Z are connected in series in this order, values 1, 2, and 3 are assigned respectively to the case (PCIe switch) X, the case (PCIe switch) Y, and the case (PCIe switch) Z. The management server computer 130 can recognize the number of cases (the number of PCIe switches) interposed between a server computer and an HBA, that is to say, a position relationship (distance) therebetween, from the information in the order column 821.

FIGS. 9A to 9F show examples of the priority management information 326. The priority management information 326 provides a guideline for selecting a failover destination at the time of failover caused by the occurrence of failure or by the administrator. The priority management information 326 includes a server computer performance priority management table 901, an I/O performance priority management table 902, a topology priority management table 903, a failover method priority management table 904, and a server positional relationship priority management table 905. The priority management information 326 also includes a table priority management table 906.

In the present example, the management server computer 130 determines priorities of failover destinations (in the present example, priorities) based on a plurality of standards (factors). The priorities of the standards are defined in each of the above-listed tables. The server computer performance priority management table 901 defines priorities with respect to performance relationships between two server computers involved in failover. The server computer performance priority management table 901 includes a performance relationship column 911 and a priority column 912, and associates three performance relationships between the server computers with the priorities.

The following relationships are defined therein: a relationship "active=standby" whereby the performance of an active server computer is equal to the performance of a standby server computer; a relationship "active<standby" whereby the performance of a standby server computer is higher than the performance of an active server computer; and a relationship "active>standby" whereby the performance of a standby server computer is lower than the performance of an active server computer. In the priority column 912, a small number indicates a high priority (priority), and "1" indicates the highest priority. The way of expressing the priorities is similar for other tables.

"Active=standby" has the highest priority, whereas "active>standby" has the lowest priority. It should be note that "active" and "standby" denote a failover source server computer and a failover destination server computer, respectively. Here, failover involving a single server computer is also embraced. In this respect, the same goes for the HBAs.

More specifically, in the case of failover attributed to failure in an HBA, if the same server computer is to be used (if the failover destination server computer is the active server computer), the priority of the server computer performance is "1" corresponding to "active=standby". Priorities according to the present example are defined in the light of prevention of a decrease in the performances of server computers caused by failover, and selection of an appropriate server computer in another prospective failover.

The performances of server computers are judged using the CPU performances and the memory performances in the server computer performance management table 701. For example, if a standby server computer has a higher CPU performance and a higher memory performance than an active server computer, the relationship is judged as "active<standby". If the standby server computer has the same CPU performance and the same memory performance as the active server computer, the relationship is judged as "active=standby". For any other combinations, the relationship is judged as "active>standby". Only one of the CPU performances and the memory performances may be used in the judgment of the performances of server computers.

The I/O performance priority management table 902 shown in FIG. 9B includes an I/O performance column 921 and a priority column 922, and defines priorities with respect to I/O performance relationships between two HBAs involved in failover. Three relationships are defined as the I/O performance relationships, similarly to the case of the server computer performance priority management table 901.

I/O performance of communication by an HBA is determined by transfer performance (link speed) of the HBA and switching performance (link speed) of an FC switch to which the HBA is connected. More specifically, a minimum value of link speeds of the HBA and the FC switch is adopted as the I/O performance of the HBA. In the present example, as shown in FIGS. 7B and 7C, the link speed of the FC switch 140 is equal to or higher than any of the link speeds of the HBAs. The I/O performance with respect to each HBA matches the link speed of the HBA.

The topology priority management table 903 shown in FIG. 9C defines priorities with respect to positional relationships (topologies) between a failover destination server computer and a failover destination HBA. The topology priority management table 903 includes a topology column 931 and a priority column 932, and associates positional relationships between the failover destination server computer and the failover destination HBA with different priorities.

More specifically, the following relationships are defined therein: a relationship "same case" whereby they are present in the same case; a relationship "separate cases (neighboring)" whereby they are present in separate cases that neighbor each other; a relationship "separate cases (neighboring with one case therebetween)" whereby they are present in separate cases that neighbor each other with one case therebetween (another case is further present between two cases that respectively accommodate the server computer and the HBA); and a relationship "separate cases (neighboring with two cases therebetween)" whereby they are present in separate cases that neighbor each other with two cases therebetween (two other cases are further present between two cases that respectively accommodate the server computer and the HBA).

In the present example, a maximum of four PCIe switches can be connected through cascade connection, and the farthest positional relationship between an HBA and a server computer is "separate cases (neighboring with two cases therebetween)". The number of connectable switches depends on design. As shown in FIG. 9C, the closer the HBA and the server computer are to each other, i.e., the smaller the number of switches interposed for data communication is, the higher the priority is. For example, the positional relationship whereby the HBA and the server computer are in the same case has the highest priority. This is because the longer the distance between the HBA and the server computer is, the larger the number of PCIe switches interposed for data communication becomes, and the lower the link performance and reliability become. The topology is a standard for performance and reliability of a failover destination pair.

The failover method priority management table 904 shown in FIG. 9D includes a failover method column 941 and a priority column 942, and defines priorities associated with different failover methods. In FIG. 9D, "continued use of HBA" indicates that an active server computer fails over to a different standby server computer and the same HBA is used (a failover destination HBA is the same active HBA, see FIG. 6).

"Failover of HBA" indicates that an active HBA fails over to a different standby HBA and the same active server computer is used (a failover destination server computer is the same active server computer). "Failover of both" indicates that an active server computer and an active HBA fail over to a different standby server computer and a different standby HBA, respectively (see FIG. 5).

The server positional relationship priority management table 905 shown in FIG. 9E defines the positional relationships between two server computers involved in failover in association with priorities. More specifically, the positional relationships "same server", "separate servers in same case", and "separate servers in separate cases" are defined, and priorities 1 to 3 are assigned to the relationships. "Same server" indicates that a failover destination server computer is the same as an active server computer.

The table priority management table 906 shown in FIG. 9F defines priorities (in the present example, priorities) of the aforementioned tables 901 to 905 that are referred to in determining the priorities of failover destinations. In the present example, the priorities given to the server computer performance priority management table 901, the HBA performance priority management table 902, the topology priority management table 903, the failover method priority management table 904, and the server positional relationship priority management table 905 descend in this order. In the present example, the user requirement acceptance program 323 changes the priorities in the table priority management table 906 in accordance with a request from the administrator. A description in this regard will be provided later.

FIG. 10 shows an example of the failover destination candidate information 327. The failover destination candidate information 327 includes a failover destination candidate table 500. The management server computer 130 dynamically generates the failover destination candidate table 500 in failover processing for the server computers and HBAs. In the failover processing, at least one of an active server computer and an active HBA fails over to another standby apparatus.

The failover destination candidate table 500 shown in FIG. 10 corresponds to the example of failover shown in FIG. 5. The failover destination candidate table 500 includes a possible failover destination pair column 501, a server computer performance column 502, an I/O performance column 503, a topology column 504, a failover method column 505, and a server positional relationship column 506. The columns 502 to 506 store data defined in the priority management tables 901 to 905, respectively.

The possible failover destination pair column 501 stores failover destination pairs that are selectable in the failover processing. If a server computer fails, server computers selectable as failover destinations are server computers in a standby state, and selectable HBAs are the current HBA connected to the failed server computer and HBAs in a standby state.

If an HBA fails, HBAs selectable as failover destinations are HBAs in a standby state, and selectable server computers are the current server computer connected to the failed HBA and server computers in a standby state.

In the example shown in FIG. 5, failure has occurred in the server computer B (112B). Server computers selectable as failover destinations are the standby server computer C (112C) and the standby server computer E (112E). Selectable HBAs are the active HBA-B (114B) and the standby HBA-D (114D). Any combination of these server computers and HBAs is a selectable pair. The number of entries in the failover destination candidate table 500 matches the number of selectable pairs (in the present example, four pairs). In the example of FIG. 10, the possible failover destination pair column 501 stores all of the above pairs.

The description of the priority management information 326 that has been provided with reference to FIGS. 9A to 9F applies to the server computer performance column 502, the I/O performance column 503, the topology column 504, the failover method column 505, and the server positional relationship column 506.

For example, with regard to a pair of the server computer E and the HBA-D in the fourth entry, the performance of the server computer E is equal to the performance of the server computer B (see the server computer performance management table 701 in FIG. 7A). Data in the server computer performance column 502 accordingly indicates "active=standby". The performance of the HBA-D is equal to the performance of the HBA-B (see the HBA performance management table 702 in FIG. 7B), and these HBAs are connected to the same FC switch (see the server computer-HBA connection management table 801 in FIG. 8A). Data in the I/O performance column 503 accordingly indicates "active=standby".

The server computer D and the HBA-D are accommodated in the same case (see FIG. 5 and the server computer-HBA connection management table 801 in FIG. 8A). Data in the topology column 504 accordingly indicates "same case". As both of the server computer and HBA fail over to standby apparatuses different from active apparatuses, data in the failover method column 505 indicates "failover of both". The server computers B and D are accommodated in different cases 111A and 111B, respectively (see FIG. 1 and the server computer-HBA connection management table 801 in FIG. 8A). Data in the server positional relationship column 506 accordingly indicates "separate server computers in separate cases".

FIG. 11 shows an example of the user requirement management information 328 for managing user requirements. The user requirement management information 328 includes a user requirement management table 600. The user requirement management table 600 includes information indicating a guideline for determining the priorities of failover destinations, and whether or not to maintain the SMP configuration of a failover destination server computer at the time of failover.

More specifically, the user requirement management table 600 includes a configured factor column 601 and a content column 602. Data in the content column 602 is configured by the administrator. The configured factor column 601 includes the following fields: "priorities for determining failover destination", and "failover to server computer with SMP configuration". The "content" of the "priorities for determining failover destination" defines the priorities of the priority management tables 901 to 905 (see the table priority management table 906 in FIG. 9F).

In the present example, the administrator can configure the priorities of the server computer performance priority management table 901, the I/O performance priority management table 902, and the topology priority management table 903. While the priorities of these three tables are variable, the priorities of the failover method priority management table 904 and the server positional relationship priority management table 905 are fixed. Alternatively, the priorities of all tables may be variable.

The administrator can assign one of the priorities 1 to 3 to each of the server computer performance priority management table 901, the I/O performance priority management table 902, and the topology priority management table 903. In the example of FIG. 11, the order of the priorities of these three tables 901 to 903 matches that of the example of the table priority management table 906 shown in FIG. 9F.

The "content" of the "failover to server computer with SMP configuration" indicates whether to maintain or discontinue the SMP configuration of a failover destination server computer. In the example of FIG. 11, the administrator requests that the SMP configuration of the failover destination server computer be maintained. That is to say, if a server computer selected as a failover destination has the SMP configuration in which a plurality of server computer are coupled together, this server computer having the SMP configuration takes over tasks of an active server computer.

On the other hand, in the case where failover with discontinuation of the SMP configuration is requested, a part of the server computers included in the SMP configuration takes over the tasks of the active server computer. In this manner, upon failover to a server computer having the SMP configuration, the administrator can select whether to perform failover while maintaining this SMP configuration, or to perform failover with discontinuation of this SMP configuration.

The content of the "priorities for determining failover destination" in the user requirement management table 600 is reflected in the table priority management table 906. As will be described later, when the administrator updates the "content" of the "priorities for determining failover destination", the user requirement acceptance program 323 accordingly updates the table priority management table 906.

Figure 12:
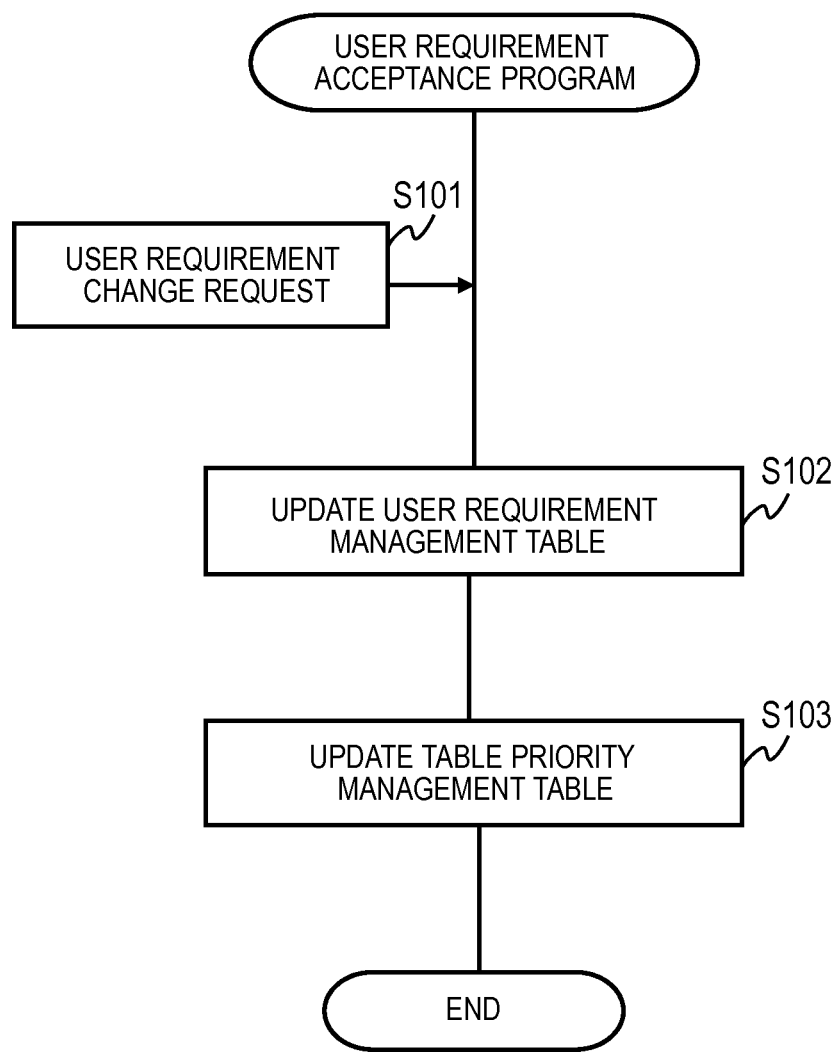
FIG. 12 is a flowchart showing an exemplary flow of a user requirement acceptance program in response to a user requirement change event issued when an administrator changes a user requirement in the present embodiment.

The following describes processing of the management programs 321 to 323 in the management server computer 130. The management programs 321 to 323 are event-driven programs. FIG. 12 shows a flow of the user requirement acceptance program 323 in response to a user requirement change event that is issued when the administrator changes a user requirement.

The administrator can change the user requirements in the user requirement management table 600 using a user interface provided by the user requirement acceptance program 323. The administrator inputs a new user requirement via the input device 137 while viewing an image displayed on the display 138.

Upon receiving the input from the administrator (S101), the user requirement acceptance program 323 accordingly updates the user requirement management table 600 (S102). The user requirement acceptance program 323 updates the priority of each table in the table priority management table 906 in accordance with the update of the "content" of the "priorities for determining failover destination" in the user requirement management table 600 (S103).

Figure 13:
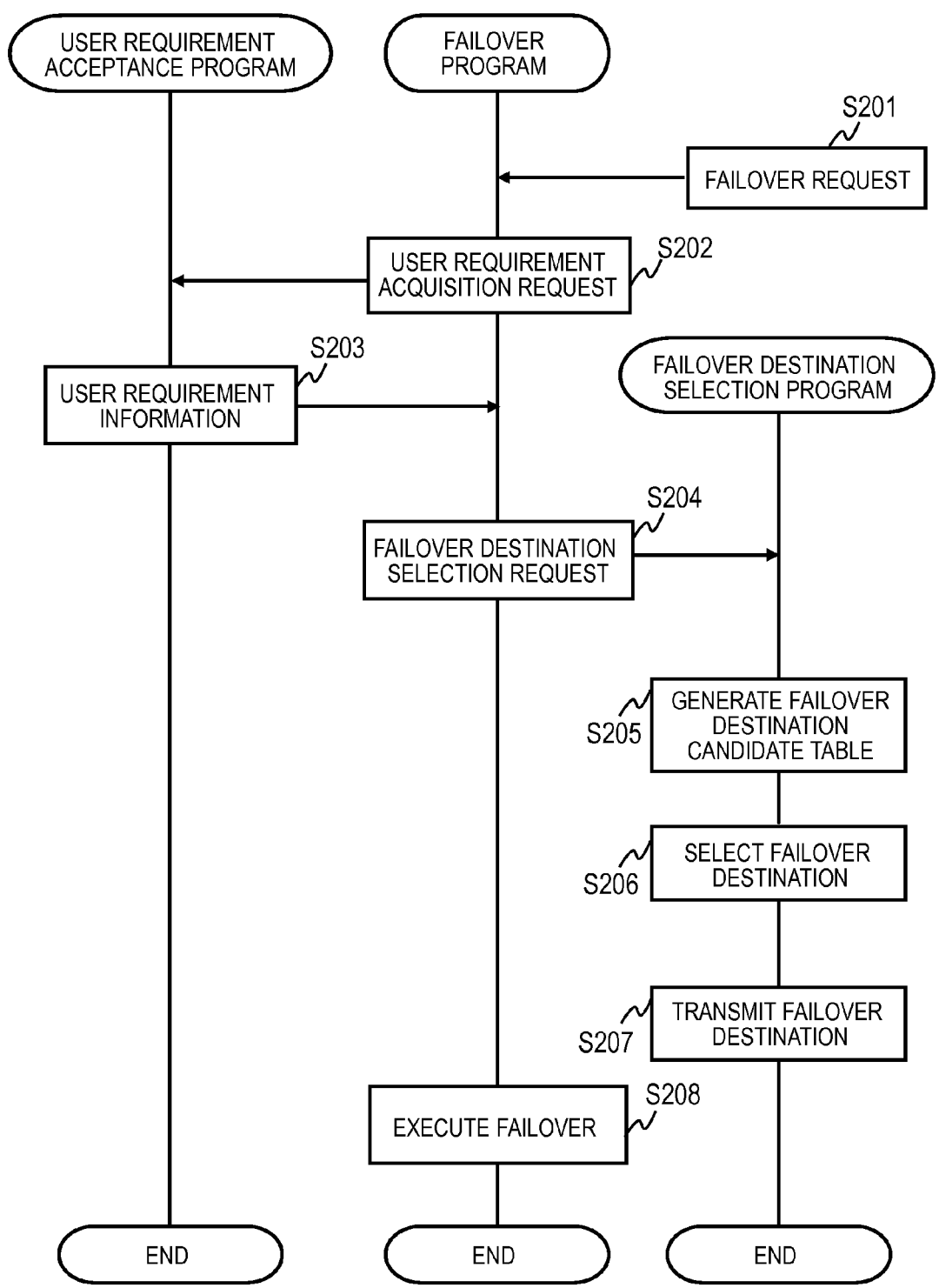
FIG. 13 is a flowchart showing exemplary flows of the user requirement acceptance program, a failover program, and a failover destination selection program according to the present embodiment.

FIG. 13 shows a flow in response to a failover request event that is issued by the occurrence of failure and by a failover instruction from the administrator. For example, if the server system 110A fails, the controller of the server system 110A transmits a failover request to the management server computer 130. The administrator inputs a failover instruction via the input device 137, and the user requirement acceptance program 323 transfers the input failover instruction to the failover program 321.

The failover request includes an identifier for designating a server computer or an HBA that should fail over. The failover request may be an instruction for failover of both of the active server computer and HBA. The apparatus that should fail over (server computer or HBA) is a failed apparatus or an apparatus designated by the administrator.

Upon receiving the failover request (S201), the failover program 321 transmits a user requirement acquisition request to the user requirement acceptance program 323 (S202). In response to the user requirement acquisition request, the user requirement acceptance program 323 transmits user requirement information to the failover program 321 (S203). The user requirement information includes the "content" of the "failover to server computer with SMP configuration" in the user requirement management table 600.

The failover program 321 transmits a failover destination selection request to the failover destination selection program 322 (S204). The failover destination selection request includes an identifier for designating an apparatus (server computer or HBA) that should fail over to another apparatus. This is the identifier of the apparatus designated by the failover request received by the failover program 321.

In response to the received failover destination selection request, the failover destination selection program 322 generates the failover destination candidate table 500 (S205). Specifics of a method for generating the failover destination candidate table 500 will be described later. The failover destination selection program 322 further selects a failover destination from the failover destination candidate table 500 with reference to the priority management information 326 (S206), and transmits information to that effect to the failover program 321 (S207). Specifics of the selection of the failover destination will be described later.

The failover program 321 receives the failover destination information, and performs failover to the failover destination indicated by this information (S208). More specifically, the failover program 321 designates a server computer and an HBA representing failover sources, as well as a server computer and an HBA representing failover destinations, and instructs the server system 110A and/or the server system 110B to perform the failover. The server system 110A and/or the server system 110B performs the failover in accordance with the instruction from the failover program 321.

Figure 14:
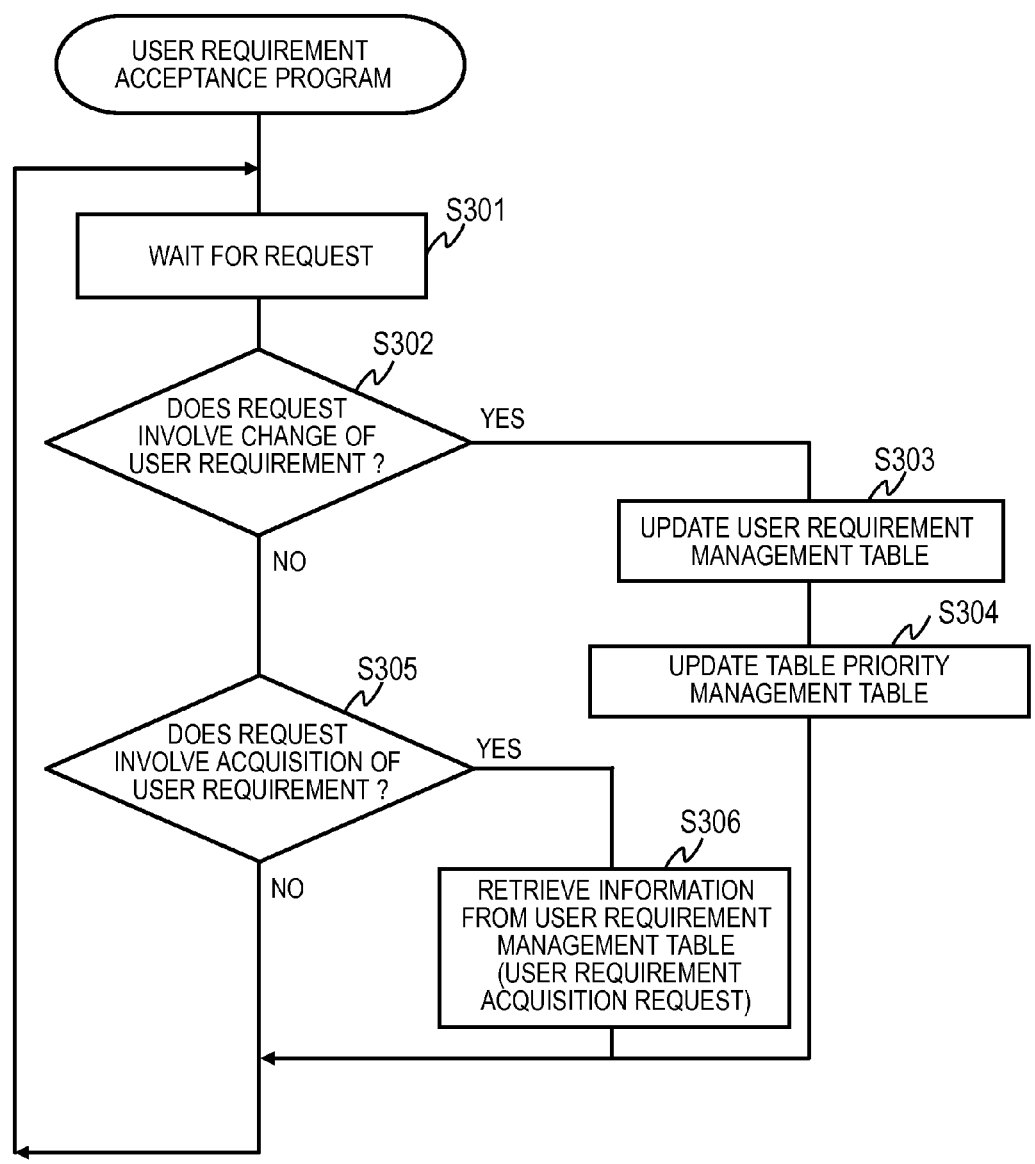
FIG. 14 is a flowchart showing an exemplary flow of the user requirement acceptance program according to the present embodiment.

FIG. 14 shows the specifics of the processing flows of the user requirement acceptance program 323 shown in FIGS. 12 and 13. Steps S302 to S304 are included in the flowchart of FIG. 12, while steps S305 and S306 are included in the flowchart of FIG. 13.

The user requirement acceptance program 323 is in a wait state until it receives a request (S301). If the user requirement acceptance program 323 receives a user requirement change request (S302: YES), it updates the user requirement management table 600. The user requirement acceptance program 323 also updates the table priority management table 906 in accordance with the update of the user requirement management table 600 (S304).

If the user requirement acceptance program 323 receives a user requirement acquisition request (S305: YES), it retrieves necessary information from the user requirement management table 600 and transmits the same to a request source (in the present example, the failover program 321). Note that in the present example, the necessary information includes the "content" of the "failover to server computer with SMP configuration".

Figure 15:
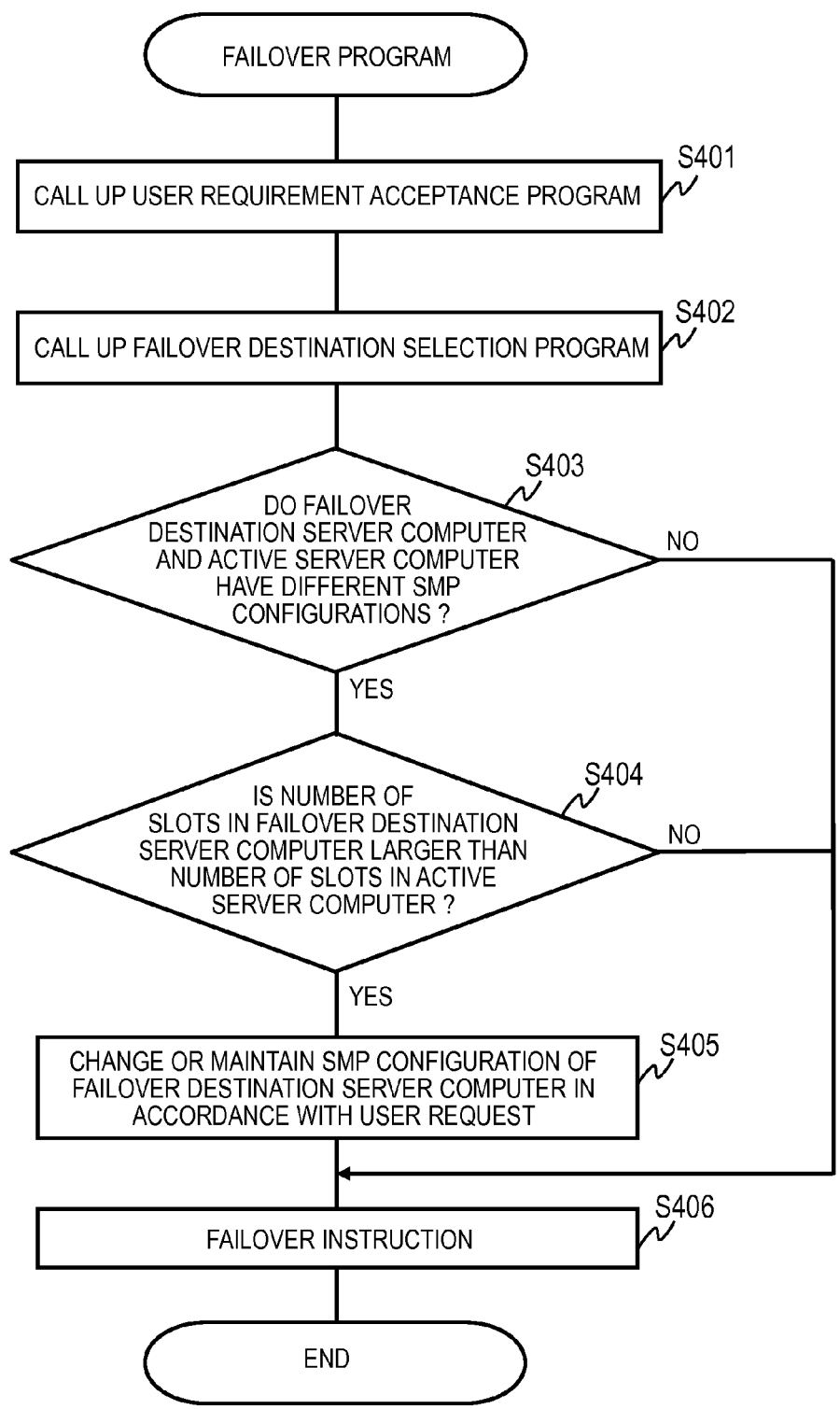
FIG. 15 is a flowchart showing an exemplary flow of the failover program according to the present embodiment.

FIG. 15 shows the specifics of the processing flow of the failover program 321 shown in FIG. 13. The present flow is executed only when the failover request is received. Step S202 for transmitting the user requirement acquisition request and step S204 for transmitting the failover destination selection request in FIG. 13 correspond to steps S401 and S402 in FIG. 15, respectively. Step S208 for performing failover in FIG. 13 corresponds to steps S403 to S406 in FIG. 15.

As has been described earlier, the failover request includes the identifier of the failover source apparatus. First, the failover program 321 calls up the user requirement acceptance program and acquires information stored in the user requirement management table 600 (S401). More specifically, the failover program 321 acquires information of the "content" of the "failover to server computer with SMP configuration".

The failover program 321 also calls up the failover destination selection program 322 and transmits the failover destination selection request to the failover destination selection program 322 (S402). The failover destination selection request includes the identifier of the failover source apparatus designated by the failover request. Thereafter, the failover program 321 receives information of a server computer and an HBA selected as failover destinations from the failover destination selection program 322. Both or only one of the server computer and the HBA representing the failover destinations differs from the server computer and the HBA representing the failover sources.

The failover program 321 judges whether or not the SMP configuration of the selected failover destination server computer differs from the SMP configuration of the failover source server computer (S403). If one of the server computers has the SMP configuration and the other of the server computers does not have the SMP configuration, or if the server computers both have the SMP configuration but include different numbers of slots, the failover program 321 judges that the two server computers have different SMP configurations (S403: YES).

If the two server computers have different SMP configurations (S403: YES), the failover program 321 further judges whether or not the number of slots in the failover destination server computer is larger than the number of slots in the failover source server computer (S404). The number of slots in a server computer that does not have the SMP configuration is one.

If the result of the judgment in step S404 is YES, the failover program 321 changes or maintains the SMP configuration of the failover destination server computer in accordance with the content of the user requirement management information 328 acquired from the user requirement acceptance program 323 (S405).

If the user requirement management information 328 indicates discontinuance of the SMP configuration of the failover destination server computer, the failover program 321 instructs the server system including the failover destination server computer to change the SMP configuration of the failover destination server computer so that the failover destination server computer matches the active (failover source) server computer in terms of configuration. The failover program 321 updates the server computer performance management table 701 and the server computer-HBA connection management table 801 in accordance with the change in the SMP configuration of the server computer. If the SMP configuration is discontinued, the number of entries of one or more server computers is increased.

If the result of the judgment in step S403 or S404 is NO, or after step S405, the failover program 321 instructs the server system 110A and/or the server system 110B to perform failover (S406).

Figure 16A:
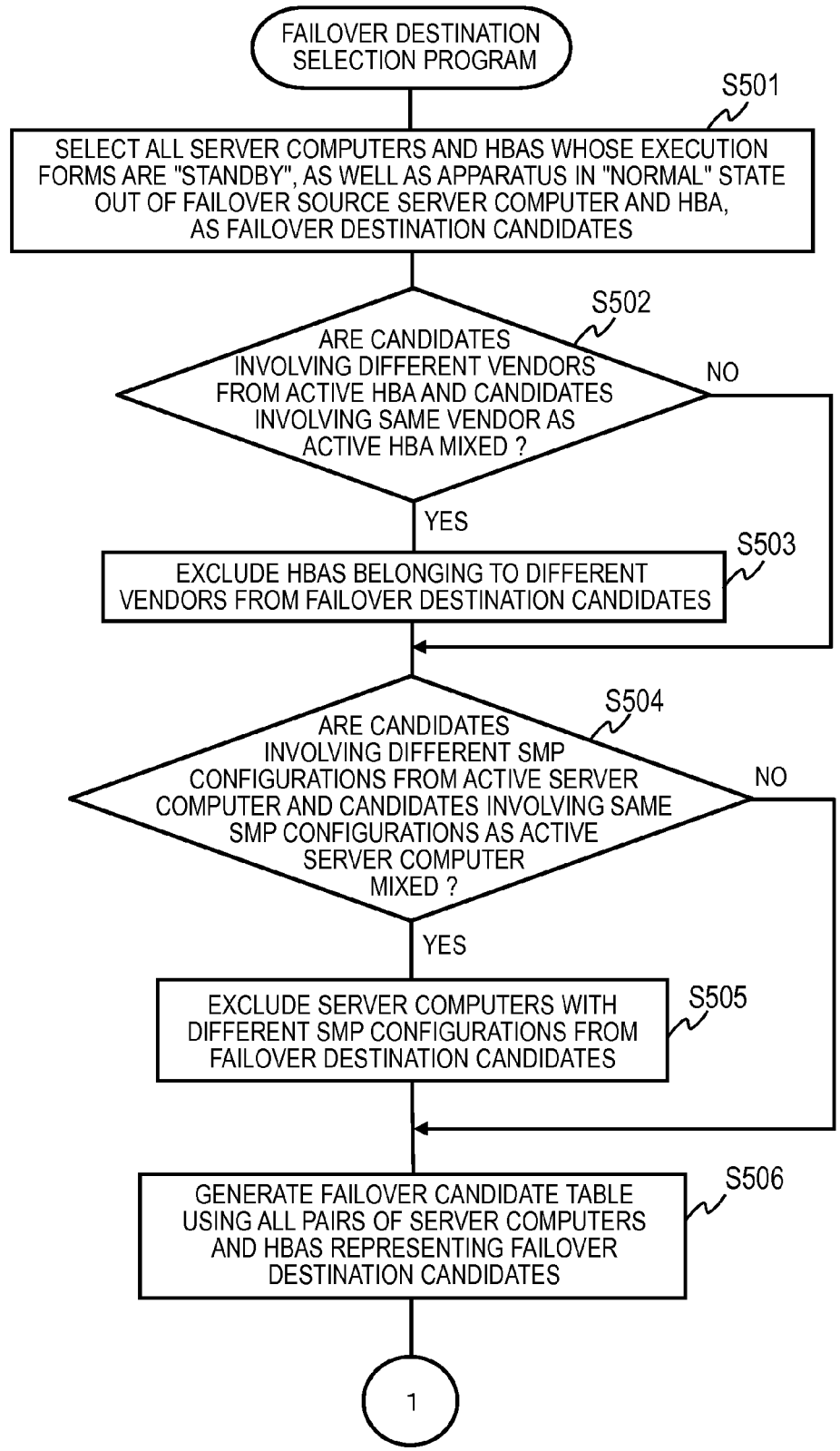
FIG. 16A is a flowchart showing an exemplary flow of the failover destination selection program according to the present embodiment.
Figure 16B:
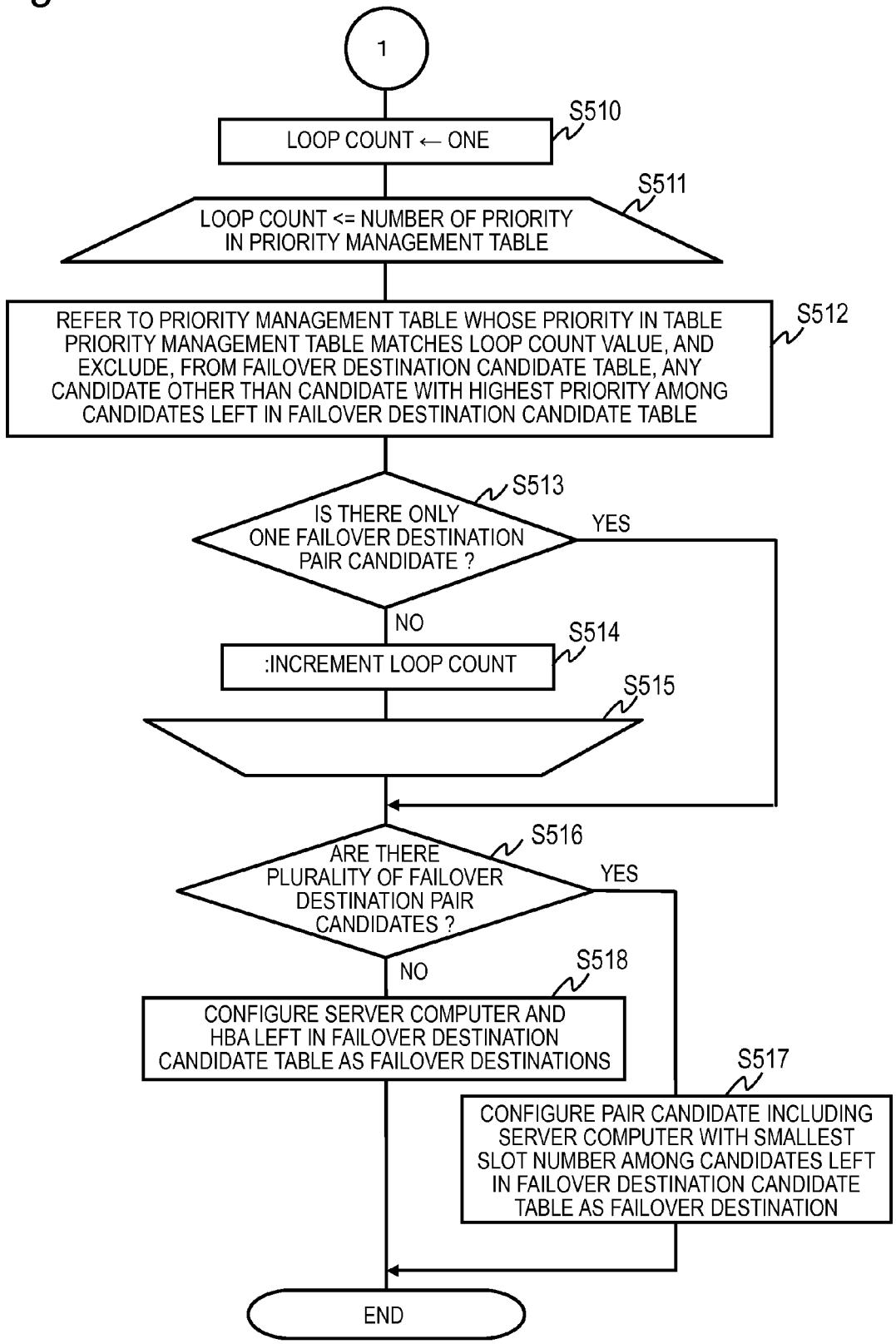
FIG. 16B is a flowchart showing an exemplary flow of the failover destination selection program according to the present embodiment.

FIGS. 16A and 16B show the specifics of the processing flow of the failover destination selection program 322 in FIG. 13. The present flow is executed only when the failover destination selection request is received. Processing of the failover destination selection program 322 mainly comprises the following two types of processing: generation of the failover destination candidate table 500 and selection of a failover destination.

A description is now given of generation of the failover destination candidate table 500 with reference to a flowchart of FIG. 16A. First, the failover destination selection program 322 selects pairs that can serve as failover destinations (possible failover destinations) (S501). A selection method will now be described.

The failover destination selection program 322 selects all server computers whose execution form columns indicate the value "standby" from the server computer performance management table 701. The failover destination selection program 322 also selects all HBAs whose execution form columns indicate the value "standby" from the HBA performance management table 702. The failover destination selection program 322 further selects an apparatus in which failure has not occurred out of the failover source server computer and the failover source HBA. The server computers and HBAs selected in step S501 are the failover destination candidate apparatuses.

The failover destination selection program 322 judges whether the HBAs selected as the failover destination candidates include both HBAs belonging to different vendors from the active HBA (failover source HBA) and HBAs belonging to the same vendor as the active HBA (S502). If the HBAs belonging to the same vendor as the active HBA and the HBAs belonging to different vendors from the active HBA are mixed (S502: YES), the failover destination selection program 322 excludes, from the failover destination candidate HBAs, the HBAs belonging to different vendors from the active HBA (S503).

If there are only HBAs belonging to the same vendor as the active HBA, or if there are only HBAs belonging to different vendors from the active HBA (S502: NO), the failover destination selection program 322 skips step S503.

Furthermore, the failover destination selection program 322 judges whether the server computers selected as the failover destination candidates include both server computers having different SMP configurations from the active server computer (failover source server computer) and server computers having the same SMP configuration as the active server computer (failover source server computer)(S504).

If the server computers having the same SMP configuration as the active server computer and the server computers having different SMP configurations from the active server computer are mixed (S504: YES), the failover destination selection program 322 excludes, from the server computers representing the failover destination candidates, the server computers having different SMP configurations from the active server computer (S505). If there are only server computers having the same SMP configuration as the active server computer, or if there are only server computers having different SMP configurations from the active server computer (S504: NO), the failover destination selection program 322 skips step S505.

The failover destination selection program 322 generates the failover destination candidate table 500, and includes all pairs of the server computers and HBAs left as the failover destination candidates into the failover destination candidate table 500 (S506).

As has been mentioned earlier, the failover destination candidate table 500 of FIG. 10 corresponds to the example of failover shown in FIG. 5. In FIG. 5, the server computer B (112B) communicates with the storage system 500 via the HBA-B (114B), and failure has occurred in this server computer B (112B). The server computer B (112B) is the apparatus that should fail over to another server computer. The server computer B (112B) and the HBA-B (114B) make up a failover source pair, and each of them represents a failover source apparatus.

As indicated by the server computer performance management table 701 of FIG. 7A, the server computer C (112C) and the server computer (112E) are standby server computers. As indicated by the HBA performance management table 702 of FIG. 7B, the HBA-D (114D) is a standby HBA. Failure has occurred in the failover source server computer B (112B), and the failover source HBA-B (114B) is operating normally. Therefore, in step S501, the server computers C (112C) and the server computer (112E) are selected as the server computers representing the failover destination candidates. The HBA-B (114B) and the HBA-D (114D) are the HBAs representing the failover destination candidates.

As indicated by the HBA performance management table 702 of FIG. 7B, the HBA-B (114B) and the HBA-D (114D) both belong to the same vendor, i.e., "company A". Therefore, the result of the judgment in step 502 is NO. As indicated by the server computer performance management table 701 of FIG. 7A, none of the server computer B (112B), the server computer C (112C), and the server computer (112E) has the SMP configuration. Therefore, the result of the judgment in step 504 is NO.

As no failover destination candidate apparatus is excluded in steps S503 and S505, the generated failover destination candidate table 500 includes all pairs of the two server computers and two HBAs described above. In FIG. 10, the failover destination candidate pairs included in the failover destination candidate table 500 are all pairs of the server computer C (112C) and the server computer (112E), and the HBA-B (114B) and the HBA-D (114D) (four pairs).

As has been described with reference to FIG. 10, the failover destination selection program 322 sets data in the server computer performance column 501 with reference to the server computer performance table 701. The failover destination selection program 322 sets data in the I/O performance column 502 with reference to the HBA performance table 702, the server computer-HBA connection management table 801, and the FC switch performance table 703. The failover destination selection program 322 sets data in the topology column 504 and the server positional relationship column 506 with reference to the server computer-HBA connection management table 801.

Next, selection of a failover destination by the failover destination selection program 322 will be described with reference to a flowchart of FIG. 16B. First, the failover destination selection program 322 sets a default value of one to a loop count (S510). The failover destination selection program 322 repeats a loop comprising steps S511 to 515. More specifically, the failover destination selection program 322 ends the repetition of this loop if the loop count exceeds the number of table priorities (the number of entries) registered with the table priority management table 906, or if the result of the judgment in step S513 is YES.

The failover destination selection program 322 executes step S512. In the first loop, the failover destination selection program 322 refers to the table priority management table 906 and identifies a table with the highest priority. In the present example, the server computer performance priority management table 901 has the highest priority.

The failover destination selection program 322 refers to the server computer performance management table 901, and judges whether the failover destination candidate table 500 includes pairs (pairs of a server computer and an HBA) whose server computer performances have different priorities as failover destination pair candidates. If the failover destination candidate table 500 includes pairs whose server computer performances have different priorities, the failover destination selection program 322 excludes, from the failover destination candidate table 500, any pair other than a pair whose server computer performance has the highest priority among such pairs.

Next, the failover destination selection program 322 judges whether there is only one failover destination pair candidate left after excluding the unnecessary pairs (S513). If there is only one failover destination pair candidate left (S513: YES), the failover destination selection program 322 exits the loop. If a plurality of failover destination pair candidates are left in the failover destination candidate table 500 (S513: NO), the failover destination selection program 322 increments the loop count (S514) and repeats the loop.

In step S512 of the second and subsequent loops, the failover destination selection program 322 refers to the table priority management table 906, and selects a priority management table with the second highest priority next to the priority management table that was selected in the previous loop. For example, the failover destination selection program 322 selects the I/O performance priority management table 902 in the second loop, and selects the topology priority management table 903 in the third loop. Similarly to the first loop, the failover destination selection program 322 refers to the selected priority management table, and makes a judgment regarding the priorities of the entries in the failover destination candidate table 500.

After exiting the loop, the failover destination selection program 322 judges whether the number of the failover destination pair candidates left is more than one or only one (S516). If there is only one failover destination pair candidate left (S516: NO), the failover destination selection program 322 selects the failover destination pair candidate left as a failover destination pair, and transmits information to that effect to the failover program 321 (S518).

If there are a plurality of failover destination pair candidates left (S516: YES), the failover destination selection program 322 selects, from thereamong, a failover destination pair candidate including a server computer with the smallest slot number as a failover destination pair, and transmits information to that effect to the failover program 321 (S517). The failover destination selection program 322 may select one failover destination pair from among a plurality of failover destination pair candidates based on other standards.

A description is now given of an example in which the flow described with reference to FIG. 16B is applied to the failover destination candidate table 500 in FIG. 10. The failover destination selection program 322 refers to the table priority management table 906, and determines to make a judgment regarding the server computer performances with reference to the server computer performance management table 701 in the first loop.

In the failover destination candidate table 500, the pair of the server computer E and the HBA-B and the pair of the server computer E and the HBA-D are the entries whose server computer performance columns 502 indicate the data "active=standby". The failover destination selection program 322 selects these two pairs as failover destination candidate pairs, and excludes other pair candidates from the failover destination candidate table 500 (S512).

As there are a plurality of failover destination candidate pairs left (S513: NO), the failover destination selection program 322 determines to make a judgment regarding the I/O performances with reference to the I/O computer performance management table 702 that has a priority of 2 in the table priority management table 906 in the next loop. In the failover destination candidate table 500, the I/O performance columns 503 of the two entries indicate the same data. Therefore, neither of the failover destination pair candidates is excluded, and both of the pair of the server computer E and the HBA-B and the pair of the server computer E and the HBA-D are left (S512).

As there are a plurality of failover destination candidate pairs (S513: NO), the failover destination selection program 322 determines to make a judgment regarding the topologies with reference to the topology management table 703 that has a priority of 3 in the next loop. In the failover destination candidate table 500, the topology of the pair of the server computer E and the HBA-B is "separate cases (neighboring)", whereas the topology of the pair of the server computer E and the HBA-D is "same case". Therefore, the failover destination selection program 322 excludes the pair of the server computer E and the HBA-B from the failover destination candidate table 500, leaving the pair of the server computer E and the HBA-D (S512).

As there is only one failover destination pair candidate left (S513: YES, S516: NO), the failover destination selection program 322 determines the pair of the server computer E and the HBA-D as the failover destination pair, and transmits information to that effect to the failover program 321 (S518).

Failover attributed to failure in an HBA (failover from an active HBA to another standby HBA) is similar to the above-described failover attributed to failure in a server computer. The management server computer 130 selects failover destination pair candidates, and determines the priorities thereof with reference to the priority management information 326. The above-described determination of the priorities of the failover destination pair candidates according to the present embodiment is applicable also to the case where the administrator issues an instruction for failover with designation of an apparatus that should be involved in failover for the purpose of system maintenance and the like.

In the foregoing example, the management server computer 130 determines one failover destination pair of a server computer and an HBA and automatically performs failover. Alternatively, the management server computer 130 may determine one or more failover destination candidates and display them on the display 138. The administrator selects failover destinations from among the presented failover destination candidates using the input device 137, and the management server computer 130 instructs the server systems 110A, 110B to perform failover to the failover destinations designated by the administrator.

FIG. 17 shows an example of a failover destination candidate image that is presented by the management server computer 130 to the administrator. In FIG. 17, the failover destination candidate image includes not only the failover destination pair candidates and information thereof shown in FIG. 10, but also information of the priorities of the failover destination pair candidates. The failover destination selection program 322 can select the failover destination pair candidates to be included in the image and acquire information thereof, including the priorities, using an algorithm similar to that for generating the failover destination candidate table 500. The administrator can issue an instruction for failover to one pair by selecting it from among the failover destination pair candidates being displayed and then selecting a failover execution button via the input device 137.

As has been described earlier, the failover destination selection program 322 sequentially selects the priority management tables 901 to 905 in order from the highest priority, and determines the priorities of the failover destination pair candidates accordingly. If there are failover destination pair candidates for which the same priority has been determined based on the selected priority management table, the failover destination selection program 322 determines the priorities of these pair candidates based on a table of the next priority. FIG. 17 shows priorities based on this determination method.

One example will now be described with reference to the failover destination candidate table 500 shown in FIG. 10. The failover destination selection program 322 determines the priorities (priorities) of the failover destination pair candidates based on the following judgment standards (judgment factors), in the stated order: server computer performance, I/O performance, topology, failover method, and server positional relationship.

First, the failover destination selection program 322 classifies the failover destination pair candidates based on the judgment standard of server computer performance. A group of a high priority (first group) comprises the pair of the server computer E and the HBA-B and the pair of the server computer E and the HBA-D. A group of a low priority (second group) comprises the pair of the server computer C and the HBA-B and the pair of the server computer C and the HBA-D.

Next, the failover destination selection program 322 further classifies each group based on the judgment standard of I/O performance. As all of the pairs have the same I/O performance, the first and second groups are maintained.

Then, the failover destination selection program 322 further classifies each group based on the judgment standard of topology. More specifically, in the first group, the pair of the server computer E and the HBA-B has a low priority, and the pair of the server computer E and the HBA-D has a high priority. In the second group, the pair of the server computer C and the HBA-B has a high priority, and the pair of the server computer C and the HBA-D has a low priority. Therefore, the priorities of the aforementioned four failover destination pair candidates are as shown in FIG. 16.

FIG. 17 shows an example of a displayed image. The management server computer 130 may display information different therefrom with regard to the priorities of the failover destination pair candidates. The management server computer 130 may display only a part of the failover destination pair candidates that has been selected for having high priorities, or may display only a part of the information in FIG. 17. The priorities may be expressed using a method different from numeric representation.

While the embodiment of the present invention has been described above in detail with reference to the drawings, the present invention is by no means limited to the above specific configurations, and embraces various modifications and equivalent configurations that fall within the purport of the attached claims. For example, the management system may include a computer other than the management server computer, and at least a part of processing of the management server computer may be executed by the other computer. At least a part of programs may be realized by dedicated hardware. Programs can be installed in each computer by a program distribution server and a non-transitory computer-readable storage medium, and can be stored in a non-volatile storage device in each computer.

While the PCI switches are built in the cases of the server systems in the above-described computer system, the PCI switches may be provided externally to the cases. In this configuration, the judgment regarding topology need not be included in the determination of the priorities. The management server computer may use only a part of the above-described priority management table (judgment factors) in determining a failover destination pair or determining the priorities of failover destination pair candidates.

While unnecessary pair candidates are excluded from the failover destination candidate table in accordance with the determined priorities in the above-described example, they may be left in the failover destination candidate table with addition of values indicating the priorities of the entries.

While each of the above-described priority management tables defines three or four priorities, the number of priorities defined in each table depends on design.

A method for determining the priorities of failover destination pair candidates is not limited to the above-described method. The management system may determine the priority of each failover destination pair candidate by, for example, applying a weight coefficient to each judgment standard and adding the priorities of a plurality of judgment standards. The management system may determine the I/O performances only with reference to the performances of the HBAs. The I/O adapters of the server computers are exemplarily illustrated as, but are not limited to, the HBAs. While the above-described exemplary configuration includes the operation server computers, the present embodiment is applicable to a system including computers different therefrom.

What is claimed is:

1. A computer management system, comprising:
   a processor;
   a storage apparatus;
   a plurality of computers;
   a plurality of I/O adapters via which the plurality of computers connect to a network;
   a first case that accommodates a first part of the plurality of computers, a first part of the plurality of I/O adapters and a first switch, wherein the first switch communicatively connects the first part of the plurality of computers and the first part of the plurality of I/O adapters;
   a second case that accommodates a second part of the plurality of computers, a second part of the plurality of I/O adapters and a second switch, wherein the second switch communicatively connects the second part of the plurality of computers and the second part of the plurality of I/O adapters; and
   inter-case wiring communicatively connects the first switch and the second switch;
   wherein the storage apparatus stores:
   computer performance management information for each of the plurality of computers;
   I/O performance management information for each of the plurality of I/O adapters; and
   priority management information wherein the priority management information includes:
   a failover destination computer candidate,
   a failover destination I/O adapter candidate,
   a computer performance relationship between a failover source computer and the failover destination computer candidate, and
   an I/O performance relationship between a failover source I/O adapter and the failover destination I/O adapter candidate; and
   wherein the processor:
   determines one or more failover destination pair candidates each including a respective failover destination computer candidate and a respective failover destination I/O adapter candidate in order to perform failover from one apparatus out of a pair of an active computer and an active I/O adapter to another apparatus,
   assigns a priority of each of the one or more failover destination pair candidates and the active computer based on the computer performance management information, the I/O performance management information, and the priority management information, wherein a failover destination pair candidate in a same case as the active computer is assigned a higher priority than a failover destination pair candidate in different cases.

2. The management system according to claim 1, wherein
the priority management information further includes a positional relationship between the failover destination computer candidate and the failover destination I/O adapter candidate, and the processor further:

determines the priority of each of the one or more failover destination pair candidates with reference to the priority management information based on the positional relationship between the failover destination computer candidate and the failover destination I/O adapter candidate.

3. The management system according to claim 1, wherein
the priority management information further includes a plurality of standards, wherein the plurality of standards including the computer performance relationship and the I/O performance relationship, and the processor assigns the priority of each of the one or more failover destination pair candidates based on the plurality of standards in advance.

4. The management system according to claim 1, wherein
when there are a plurality of failover destination pair candidates, the processor selects, from among the plurality of failover destination pair candidates, a failover destination pair corresponding to the active computer and the active I/O adapter based on priorities of the plurality of failover destination pair candidates.

5. The management system according to claim 1, wherein
the storage apparatus further stores configuration information configured by a user, the configuration information indicating, when a particular computer included in a failover destination pair candidate is configured to include the plurality of computers coupled together, whether to change or maintain the configuration, and the processor further determines whether to maintain or change a configuration of the particular computer included in each of the one or more failover destination pair candidates in accordance with the configuration information.

6. The management system according to claim 1, further including a display apparatus that displays the priorities of the one or more failover destination pair candidates.

7. The management system according to claim 1, wherein
the storage apparatus further stores vendor information of the plurality of I/O adapters, and the processor further identifies vendors of I/O adapters that are selectable as failover destination I/O adapter candidates from among the plurality of I/O adapters with reference to the vendor information, and selects I/O adapters belonging to a same vendor as the active I/O adapter as failover destination I/O adapter candidates included the one or more failover destination pair candidates.

8. The management system according to claim 1, wherein
the one apparatus is the active computer, and the processor further selects a standby computer as the failover destination computer candidate from among the plurality of computers, and selects each of the active I/O adapter and a standby I/O adapter as the failover destination I/O adapter candidate from among the plurality of I/O adapters.

9. A method for managing a computer system, the method comprising:

storing, in a storage apparatus:

computer performance management information for of each of a plurality of computers, wherein a first portion of the plurality of computers are accommodated in a first case and a second portion of the plurality of computers are accommodated in a second case, I/O performance management information for each of a plurality of I/O adapters, wherein a first portion of the plurality of I/O adapters are accommodated in the first case and a second portion of the plurality of I/O adapters are accommodated in the second case, and priority management information, wherein the priority management information includes:

a failover destination computer candidate, a failover destination I/O adapter candidate, a computer performance relationship between a failover source computer and the failover destination computer candidate, and an I/O performance relationship between a failover source I/O adapter and the failover destination I/O adapter candidate;

determining one or more failover destination pair candidates each including a respective failover destination computer candidate and a respective failover destination I/O adapter candidate in order to perform failover from one apparatus out of a pair of an active computer and an active I/O adapter to another apparatus, and assigning a priority of each of the one or more failover destination pair candidates and the active computer based on the computer performance management information, the I/O performance management information, and the priority management information, wherein a failover destination pair candidate in a same case as the active computer is assigned a higher priority than a failover destination pair candidate in different cases.

10. A non-transitory computer-readable storage medium including a program code that causes a management system to execute a method, the method comprising:

storing, in a storage apparatus:

computer performance management information for of each of a plurality of computers, wherein a first portion of the plurality of computers are accommodated in a first case and a second portion of the plurality of computers are accommodated in a second case, I/O performance management information for each of a plurality of I/O adapters, wherein a first portion of the plurality of I/O adapters are accommodated in the first case and a second portion of the plurality of I/O adapters are accommodated in the second case, and priority management information, wherein the priority management information includes:

a failover destination computer candidate, a failover destination I/O adapter candidate, a computer performance relationship between a failover source computer and the failover destination computer candidate, and an I/O performance relationship between a failover source I/O adapter and the failover destination I/O adapter candidate;

determining one or more failover destination pair candidates each including a respective failover destination computer candidate and a respective failover destination I/O adapter candidate in order to perform failover from one apparatus out of a pair of an active computer and an active I/O adapter to another apparatus; and assigning a priority of each of the one or more failover destination pair candidates and the active computer based on the computer performance management information, the I/O performance management information, and the priority management information, wherein a failover destination pair candidate in a same case as the active computer is assigned a higher priority than a failover destination pair candidate in different cases.

\* \* \* \* \*